US007452396B2

(12) United States Patent
Terlson et al.

(10) Patent No.: US 7,452,396 B2
(45) Date of Patent: Nov. 18, 2008

(54) COLLAPSIBLE AUTO EXPANDING MEDIA FILTER

(75) Inventors: Brad A. Terlson, Maple Grove, MN (US); Charles E. Bartlett, Gilbert, AZ (US); Jeremy W. Peterson, Lakeville, MN (US); David Justin McCurnin, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 304 days.

(21) Appl. No.: 11/276,465

(22) Filed: Mar. 1, 2006

(65) Prior Publication Data
US 2007/0204576 A1    Sep. 6, 2007

(51) Int. Cl.
*B01D 46/00* (2006.01)
(52) U.S. Cl. .............................. 55/496; 55/493; 55/497; 55/521; 55/DIG. 31
(58) Field of Classification Search ................ 55/483, 55/484, 493, 495, 496, 497, 500, 503, 511, 55/521, DIG. 31
See application file for complete search history.

(56) References Cited

U.S. PATENT DOCUMENTS

| 3,789,589 | A |   | 2/1974  | Delany et al.          |
|-----------|---|---|---------|------------------------|
| 3,871,851 | A |   | 3/1975  | Neumann                |
| 4,008,060 | A |   | 2/1977  | Andreae                |
| 4,323,379 | A |   | 4/1982  | Shearin                |
| 5,133,789 | A | * | 7/1992  | Smith ............ 55/491 |
| 5,252,111 | A |   | 10/1993 | Spencer et al.         |
| 5,273,563 | A | * | 12/1993 | Pasch et al. ........ 55/493 |
| 5,273,564 | A |   | 12/1993 | Hill                   |
| 5,312,467 | A | * | 5/1994  | Wolfe ............ 55/493 |
| 5,501,794 | A |   | 3/1996  | Van de Graaf et al.    |
| 5,743,927 | A |   | 4/1998  | Osendorf               |
| 5,779,747 | A |   | 7/1998  | Schlor et al.          |
| 5,807,415 | A | * | 9/1998  | Leo ............ 55/385.3 |
| 5,840,094 | A |   | 11/1998 | Osendorf et al.        |
| 5,944,860 | A |   | 8/1999  | Mack et al.            |
| 5,968,217 | A | * | 10/1999 | Stein et al. ........ 55/496 |
| 6,007,596 | A | * | 12/1999 | Rosen ............ 55/491 |
| 6,059,964 | A |   | 5/2000  | Strawser, Sr.          |
| 6,328,778 | B1|   | 12/2001 | Richerson et al.       |
| 6,406,509 | B1| * | 6/2002  | Duffy ............ 55/492 |

(Continued)

FOREIGN PATENT DOCUMENTS

WO          9417897         8/1994

(Continued)

*Primary Examiner*—Duane Smith
*Assistant Examiner*—Robert A Clemente

(57) ABSTRACT

Collapsible filter assemblies for use with pleated or other filter media are disclosed. A collapsible filter assembly can include at least one filter element including a filter media supported within a collapsible filter frame. The filter frame can include a number of frame members each including a number of frame panel sections hingedly connected to each other. Each frame member can be configured to bend or fold outwardly away from the sides of the filter media to permit the filter frame to be actuated between a collapsed position and an expanded position. A number of elastic members can be coupled to opposing sets of frame members in order to bias the filter frame in the expanded position, causing the filter assembly to self-expand when removed from its packaging. During installation, such auto-expanding feature reduces the amount of time required for the installer to place the filter assembly into service.

32 Claims, 24 Drawing Sheets

U.S. PATENT DOCUMENTS

| | | |
|---|---|---|
| 6,585,793 B2 | 7/2003 | Richerson et al. |
| 6,592,643 B2 | 7/2003 | Shah et al. |
| 6,599,343 B2 | 7/2003 | Fredrick et al. |
| 6,638,333 B2 | 10/2003 | Schuld et al. |
| 6,652,613 B2 | 11/2003 | Shah et al. |
| 6,790,397 B2 | 9/2004 | Richerson et al. |
| 6,843,820 B2 | 1/2005 | Kubokawa |
| 6,846,342 B2 * | 1/2005 | Mertz et al. ............ 55/486 |
| 6,860,916 B2 | 3/2005 | Kubokawa et al. |
| 6,875,250 B2 | 4/2005 | Terlson |
| 6,955,702 B2 | 10/2005 | Kubokawa et al. |
| 7,037,354 B1 * | 5/2006 | Dimicelli ............ 55/497 |
| 7,077,921 B1 * | 7/2006 | Dimicelli ............ 156/60 |
| 7,156,891 B2 * | 1/2007 | Winters et al. ......... 55/497 |
| 7,255,723 B2 * | 8/2007 | Choi et al. ............ 55/499 |
| 2003/0205039 A1 | 11/2003 | Terlson |
| 2004/0182055 A1 * | 9/2004 | Wynn ............ 55/497 |
| 2005/0138905 A1 | 6/2005 | Kubokawa |

FOREIGN PATENT DOCUMENTS

| | | |
|---|---|---|
| WO | 0006287 | 10/2000 |
| WO | 0059604 | 10/2000 |
| WO | 2005074468 | 8/2005 |

* cited by examiner

COLLAPSIBLE AUTO EXPANDING MEDIA FILTER

FIELD

The present invention relates generally to the field of media filters. More specifically, the present invention pertains to collapsible filter assemblies for use with pleated filter media.

BACKGROUND

Media filters such as disposable air filters are used to filter intake air in a wide variety of applications. In heating, ventilation, and air-conditioning (HVAC) applications, for example, such media filters are often provided as part of a filtration system for filtering intake air into HVAC equipment such as a fan or blower. A typical residential air circulation system includes a fan, which acts to draw air within the occupied space of the house into an intake opening for reheating or reconditioning. The filter media for such filters may have a pleated configuration that permits particulate contamination to be trapped in the filter without significantly reducing air flow through the filter. In some panel systems, the pleated filter media may be positioned within a rectangular frame or framework system which supports the filter media across the face of the intake opening.

The framework for supporting the filter medium typically includes a number of edges having a U-shaped cross section that encloses the filter medium periphery to form a generally box-shaped structure. In some systems, the media and framework are designed as a unit that can later be disposed after use for a period of time. The dimensions of the filter media and supporting framework will often vary to conform to the dimensions of the intake opening in which the filter is to be installed. In some residential systems, for example, the filter media can comprise a nominally one inch (2.5 cm) thick rectangular mat having length and width dimensions of between one to two feet (30.5 cm to 61 cm).

The design of many media filters typically includes considerations such as air flow resistance and efficiency. Lower air flow resistance, measured as the pressure drop across the filter, is typically desirable since less energy is required to move a given amount of air through the filter in comparison to a filter with high air flow resistance. Increased efficiency is also desirable to remove more particulates from the air stream. In general, as the filtration efficiency of the filter increases, the pressure drop across the filter likewise increases. Since the pressure drop is proportional to the air flow rate through the filter media, one method employed to lower pressure drop without decreasing efficiency is to use a pleated filter medium. While the use of a pleated filter medium increases the surface area to better trap particulates contained in the air stream, such designs often increase the depth of the filter, in some cases to a depth of four inches (10.2 cm) or more.

The shipping and storage costs associated with many prior art media filters, including many pleated designs, often represents a significant expense in the total cost of the media filter. For pleated filters, for example, the existence of air between the pleat folds can increase the bulk filter volume required to store such filters in warehouses, on retail or distributor shelves, and/or on a contractor's truck, thus increasing distribution costs. In addition, such increase in bulk filter volume can increase the costs associated with packaging the filter.

To reduce filter volume, collapsible filters have been introduced to permit the pleated filter media to be reduced in size during periods of nonuse. In some designs, for example, the collapsible filter may include a number of detachable frame members that permit the pleated filter medium to be collapsed in an accordion-like fashion, allowing the filter medium to occupy substantially less volume than a fully expanded filter. Although such collapsible filters can be used to reduce bulk filter volume when not in use, the assembly of such devices by the installer is often difficult and time consuming. In addition, in those instances where the frame members are intended to be reusable, the removal of such frames from a dirty filter can be unpleasant. For HVAC contractors, the time required to assemble the filter can add to the total cost of installation.

SUMMARY

The present invention pertains to collapsible filter assemblies for use with pleated or other filter media. A collapsible filter assembly in accordance with an illustrative embodiment can include one or more filter elements each including a pleated filter media supported within a collapsible filter frame. The collapsible filter frame can include a number of panel sections hingedly connected to each other, allowing each frame member to bend or fold outwardly away from the sides of the filter media to permit the filter assembly to be collapsed for packaging and/or for storage purposes. The panel sections forming each frame member can be hingedly connected, for example, using a number of attachment pins, a strip of adhesive tape applied to each panel section, a living hinge formed between the panel sections, and/or by other suitable attachment means. A number of flanged sides on each frame member can be provided for supporting and retaining the sides of the filter media within the filter frame. In some embodiments, a number of foldable end sections can be further provided to retain a portion of the end panels of the filter media.

In some embodiments, an elastic member can be coupled between opposing sets of frame members located on either side of the filter media in order to self-bias the filter frame into an expanded position. The elastic members can be easily secured to a tie-down section on each frame member, which in some embodiments can include a number of slotted holes or openings adapted to frictionally receive the elastic member. Other retention features such as hooks or clamps can be further utilized in other embodiments to secure the elastic members to the frame members, if desired. In use, the elastic members exert an inwardly directed force on the frame members causing them to automatically unfold and expand, thus reducing the amount of time required for the installer to place the filter assembly into service.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
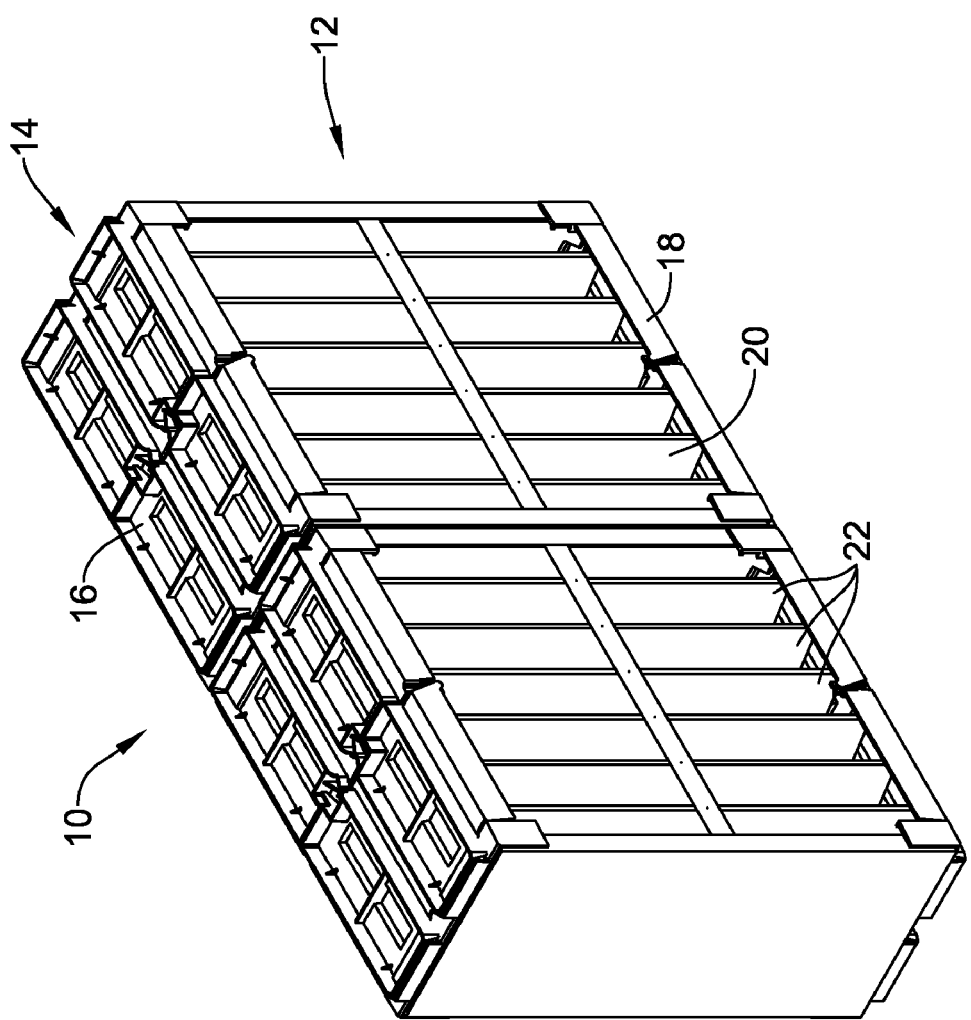
FIG. 1 is a perspective view of a collapsible filter assembly in accordance with an illustrative embodiment of the present invention.

Referring now to FIG. 1, a perspective view showing a collapsible filter assembly 10 in accordance with an illustrative embodiment of the present invention will now be described. Filter assembly 10 may generally include a filter member 12 supported within a collapsible filter frame 14 having a first foldable side 16 and a second foldable side 18. In some embodiments, the filter member 12 can be releasably secured within the filter frame 14 in order to permit the filter member 12 to be detached and removed from the filter frame 14, if desired. In other embodiments, the filter member 12 can be permanently attached to the filter frame 14 or could be formed as the same part. In either embodiment, the filter member 12 may include filter media 20 having a number of pleats 22 that can be utilized to increase the exposed surface area of the filter member 12 to the incoming air when installed within a filter box or other such structure. As is discussed in greater detail herein, the collapsible filter frame 14 can be actuated back and forth between a collapsed or folded position and an expanded or unfolded position to permit the filter assembly 10 to be easily compacted for packaging and storage, and then subsequently expanded into a generally box-like shape for installation within the intake opening of the filter box.

Figure 2:
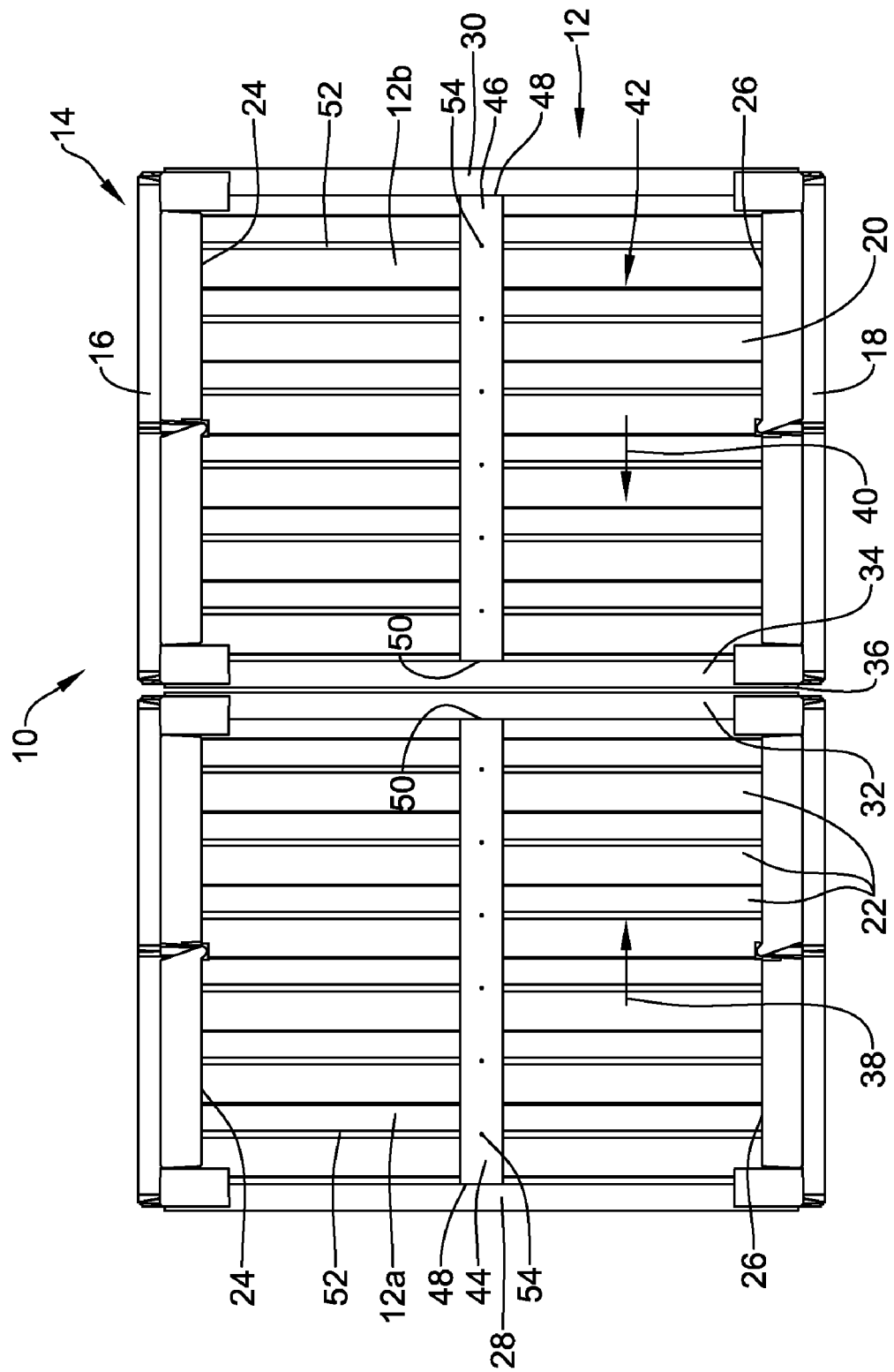
FIG. 2 is a front view showing the upstream side of the illustrative filter assembly of FIG. 1 in greater detail.

FIG. 2 is a front view showing the upstream side of the illustrative filter assembly 10 of FIG. 1 in greater detail. As can be further seen in this view, the filter member 12 can be formed by connecting two or more separate filter elements 12a,12b together, forming a combined filter media structure having a first side 24, a second side 26, a first end panel 28, and a second end panel 30. In some embodiments, each of the filter elements 12a,12b can be separately manufactured, and then attached together in an end-to-end configuration at a number of inner end panels 32,34 connected together along a common boundary 36. The fabrication of the filter member 12 using separate filter elements 12a,12b permits the manufacturer to easily vary the size of the filter assembly 10 to accommodate for differences in the size of the filter box that receives the filter assembly 10. In one such embodiment, for example, two filter elements 12a,12b each having a length of approximately 1 foot (30.5 cm) can be used to construct a filter assembly 10 having an overall length of approximately 2 feet (61 cm). Other dimensions such as the height and/or depth of the filter assembly 10 can also be varied to alter the overall size of the assembly 10, as desired.

Fabrication of the filter member 12 can be accomplished by attaching the separate filter elements 12a,12b together using an adhesive or adhesive tape applied between the inner end panels 32,34 and/or using staples, pins, or other suitable fastening means. In one illustrative embodiment, for example, the filter elements 12a,12b can be attached together using a hot-melt adhesive applied along the common periphery 36 between each filter element 12a,12b. While the filter member 12 can be formed by attaching separate filter elements 12a,12b together in an end-to-end configuration, it should be understood that the filter member 12 can be fabricated as a single element, or can be fabricated using multiple filter elements attached together in other configurations such as by attaching one or more filter elements together in a side-by-side configuration or in both a side-by-side and end-to-end configuration.

The pleats 22 for each filter element 12a,12b can have a zig-zag or other such configuration adapted to permit the filter member 12 to be collapsed in an accordion-like fashion. In the illustrative embodiment depicted in FIG. 2, the pleats 22 are each oriented lengthwise between each of the sides 24,26, allowing each filter element 12a,12b to collapse longitudinally in a direction indicated generally by left-right arrows 38 and 40, respectively. The orientation of the pleats 22 for the first filter element 12a, for example, can be configured to permit a portion of the filter member 12 to accordion inwardly, allowing the first end panel 28 to be drawn inwardly (i.e. to the right) in the direction of arrow 38. In similar fashion, the second filter element 12b can be configured to permit a portion of the filter member 12 to accordion inwardly, allowing the second end panel 30 to be drawn inwardly (i.e. to the left) in the direction of arrow 40. As discussed in greater detail herein, the filter frame 14 supporting the filter member 12 can be configured to bend or fold outwardly away from the sides 24,26 of the filter member 12 in order to release the filter frame 14 and permit the pleats 22 for each filter element 12a,12b to be collapsed for packaging and/or storage.

The upstream side 42 of the filter shown generally in FIG. 2 can include one or more pleat spacing elements 44,46, which act to maintain a desired spacing between each adjacent pleat 22, and which prevent bowing of the pleats 22 outwardly when supported and retained within the filter frame 14. The pleat spacing elements 44,46 can each comprise an elongated member such as a strap formed from a metal, plastic, fabric, and/or other suitably flexible material.

A first end 48 of each pleat spacing element 44,46 can be attached to the outer end panel 28,30 of each corresponding filter element 12a,12b. A second end 50 of each pleat spacing element 44,46, in turn, can be attached to the inner end panel 32,34 of each corresponding filter element 12a,12b. Each pleat spacing element 44,46 can be attached to the ridges 52 of the pleats 22 at a number of attachment joints 54, connecting each pleat spacing element 44,46 to a correspondingly adjacent filter element 12a,12b. Attachment of the pleat spacing elements 44,46 to the filter elements 12a,12b can be accomplished, for example, using a hot-melt adhesive or the like.

Although only a single pleat spacing element 44,46 is shown attached to each filter element 12a,12b in FIG. 2, it should be understood that multiple such pleat spacing elements can be used to provide additional support to other locations of the filter member 12 in those embodiments where relatively large filter members are employed and/or where additional support is desired. In applications where relatively high air pressure is anticipated to flow through the filter assembly 10, for example, a greater number of pleat spacing elements can be used to support the filter elements 12a,12b, if desired.

Figure 3:
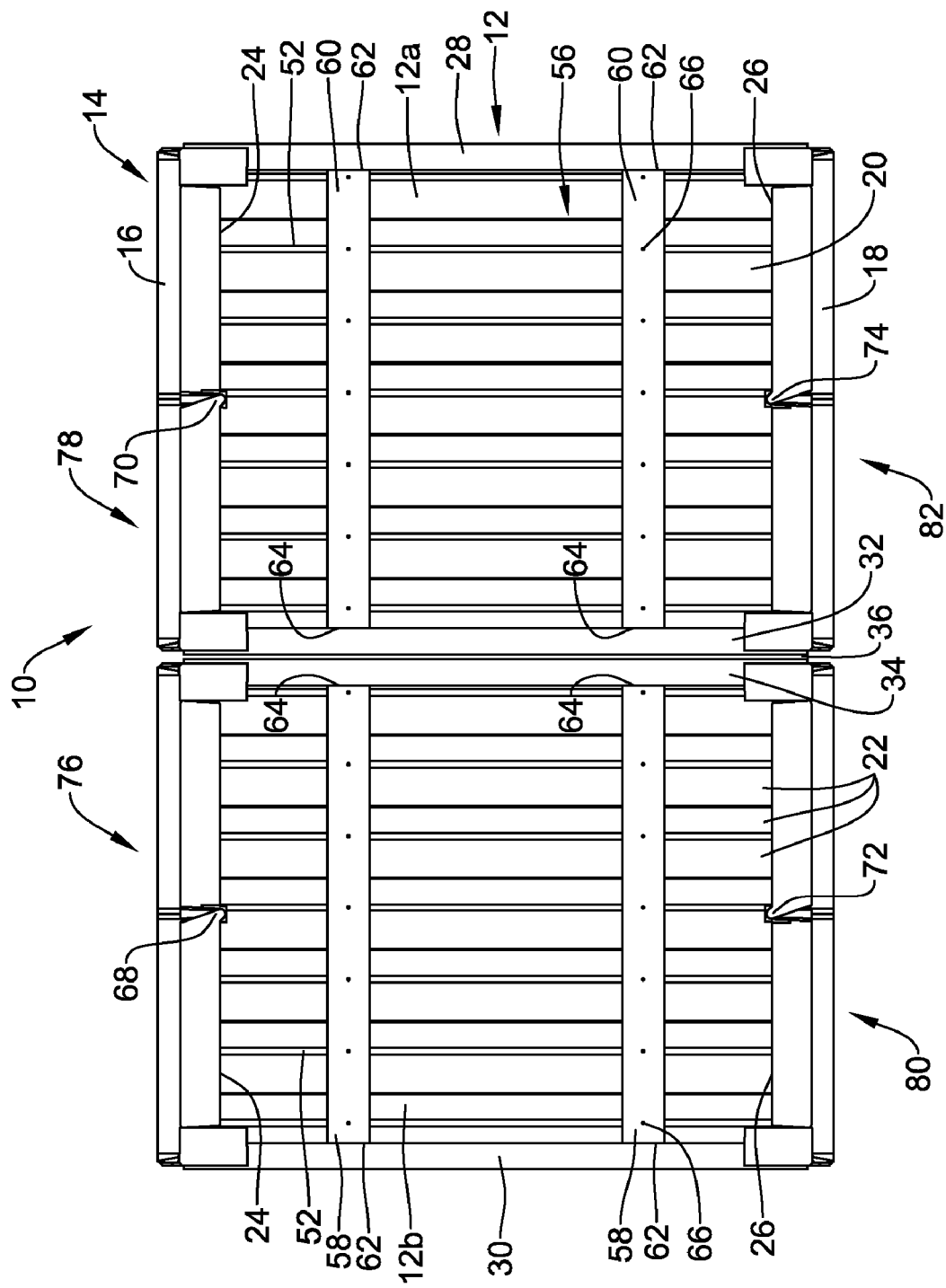
FIG. 3 is a rear view showing the downstream side of the illustrative filter assembly of FIG. 1.

FIG. 3 is a rear view showing the downstream side 56 of the illustrative filter assembly 10 of FIG. 1. As can be further seen in FIG. 3, the downstream side 56 of the filter member 12 can further include a number of additional pleat spacing elements 58,60, which, as discussed above, can be used to maintain a desired spacing between adjacent pleats 22 and to prevent bowing or buckling of the filter elements 12a,12b within the filter frame 14. As with the pleat spacing elements 44,46 coupled to the upstream side 42 of the filter member 12, the pleat spacing elements 58,60 can be attached at their respective ends 62,64 to the end panels 28,30,32,34, as shown, and can be connected to each of the pleat ridges 52 using a number of attachment joints 66. Attachment of the pleat spacing elements 58,60 to the filter elements 12a,12b can be accomplished, for example, using a hot-melt adhesive or the like. In the illustrative embodiment depicted, two pleat spacing elements 58,60 are shown attached to each correspondingly adjacent filter element 12a,12b. As with the upstream side 42, however, a greater or lesser number of pleat spacing elements 58,60 could be utilized to support each filter element 12a,12b, if desired.

As can be further understood with respect to FIG. 3, the filter frame 14 used to support the filter member 12 can be configured to bend or fold at a number of bend locations 68,70,72,74, allowing the filter frame 14 be collapsed from a generally expanded position depicted in FIG. 1 to a generally collapsed position to reduce the size of the filter assembly 10 during packaging and/or storage. In FIG. 3, for example, a first number of bend locations 68,70 provided at two spaced-apart locations on the first side 16 of the filter frame 14 can be configured to permit a first set of side frame members 76,78 to each independently pivot and displace upwardly in FIG. 3. In similar fashion, a second number of bend locations 72,74 provided at two spaced-apart locations on the second side 18 of the filter frame 14 can be configured to permit a second set of side frame members 80,82 to each independently pivot and displace downwardly in FIG. 3. When collapsed, the outward displacement of the side frame members 76,78,80,82 away from the sides 24,26 of the filter member 12 releases the structural support normally imparted to the filter elements 12a,12b. Such release allows the filter member 12 to be collapsed in an accordion-like fashion in order to reduce the overall size of the filter assembly 10. In some cases, the ability of the side frame members 76,78,80,82 to bend or fold outwardly away from the filter member 12 also prevents interference with the filter media 20 when collapsed and/or expanded.

In the illustrative embodiment depicted in FIGS. 1-3, the filter frame 14 includes four separate side frame members 76,78,80,82 used to support a filter member 12 fabricated from two separate filter elements 12a,12b. The number of side frame members may vary, however, for other filter configurations. In one alternative embodiment, for example, six such side frame members can be utilized to support a filter member fabricated from three separate filter elements coupled together in an end-to-end arrangement. In another alternative embodiment, two such side frame members can be utilized to support a filter member fabricated from only a single filter element. Other filter frame configurations are also possible.

Figure 4:
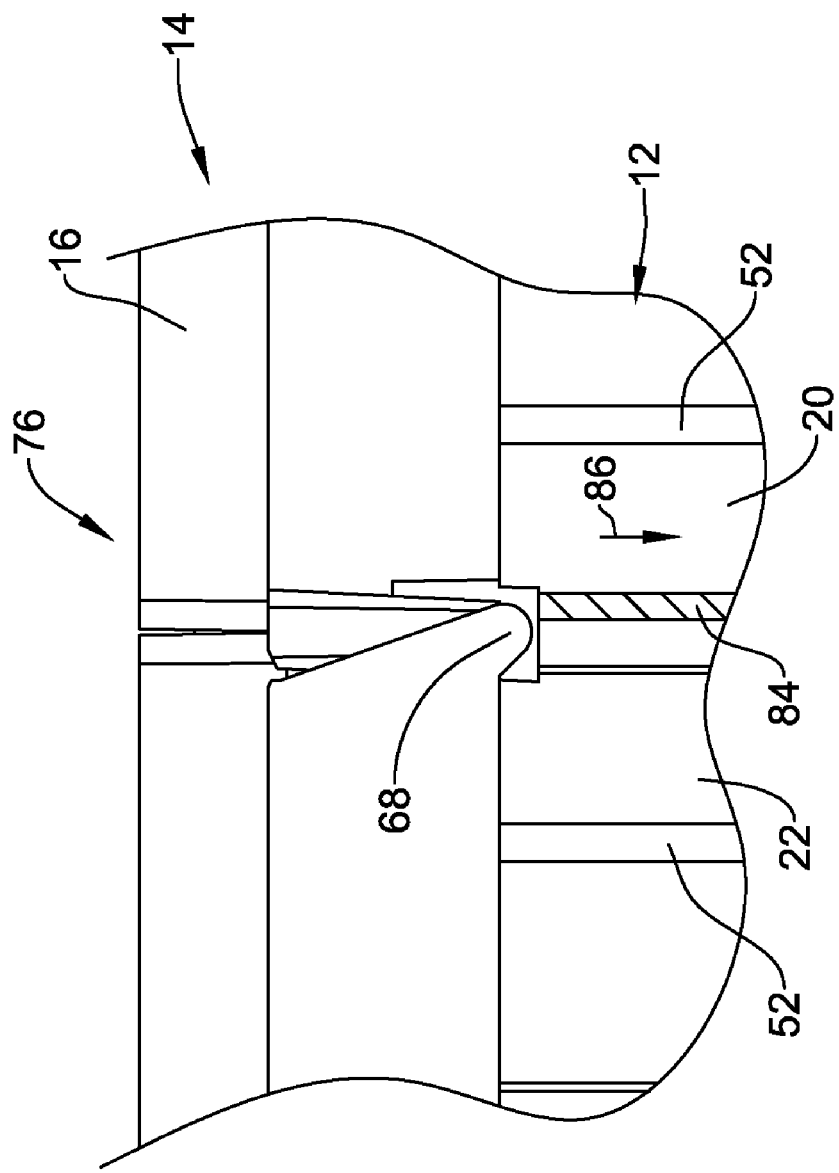
FIG. 4 is an exploded view showing the bending location for one of the side frame members illustrated in FIG. 3.

FIG. 4 is an exploded view showing the bending location 68 for one of the side frame members 76 illustrated in FIG. 3. As can be further understood with respect to FIG. 4, each of the side frame members 76,78,80,82 can be biased inwardly in the expanded position using a number of elastic members 84 extending lengthwise between each side 16,18 of the filter frame 14. A first elastic member 84 attached at a first end to side frame member 76 and at a second end thereof to the opposing side frame member 80, for example, can be configured to apply an inwardly directed force 86 to the side frame members 76,80, biasing the filter assembly 10 into its expanded position. A second elastic member 84 shown in FIG. 16 attached at a first end to side frame member 78 and at a second end thereof to the opposing side frame member 82, in turn, can be similarly configured to apply an inwardly directed force to the side frame members 78,82, further biasing the filter assembly 10 into its expanded position. Each elastic member 84 can comprise a flexible cord, band, wire, coil spring, or other suitable member capable of applying an elastic force to the filter frame 14. In some embodiments, for example, the elastic member 84 can be made from a resilient cord or band made from an elastomeric material such as rubber, although other configurations are possible.

In use, the biasing force exerted on the side frame members 76,78,80,82 via the elastic members 84 causes the filter assembly 10 to automatically expand into its expanded configuration. In those cases where the filter assembly 10 is packaged in shrink-wrap or a carton or box, for example, the biasing force of the elastic members 84 can be configured to automatically expand the filter assembly 10 when removed from its packaging, reducing the amount of time required for the installer to place the filter assembly 10 into service. Typically, the force exerted on the side frame members 76,78,80, 82 by the elastic members 84 can be overcome by exerting a sufficient force on each end panel 28,30, allowing the filter assembly 10 to be easily collapsed for packaging and/or storage.

Figure 5:
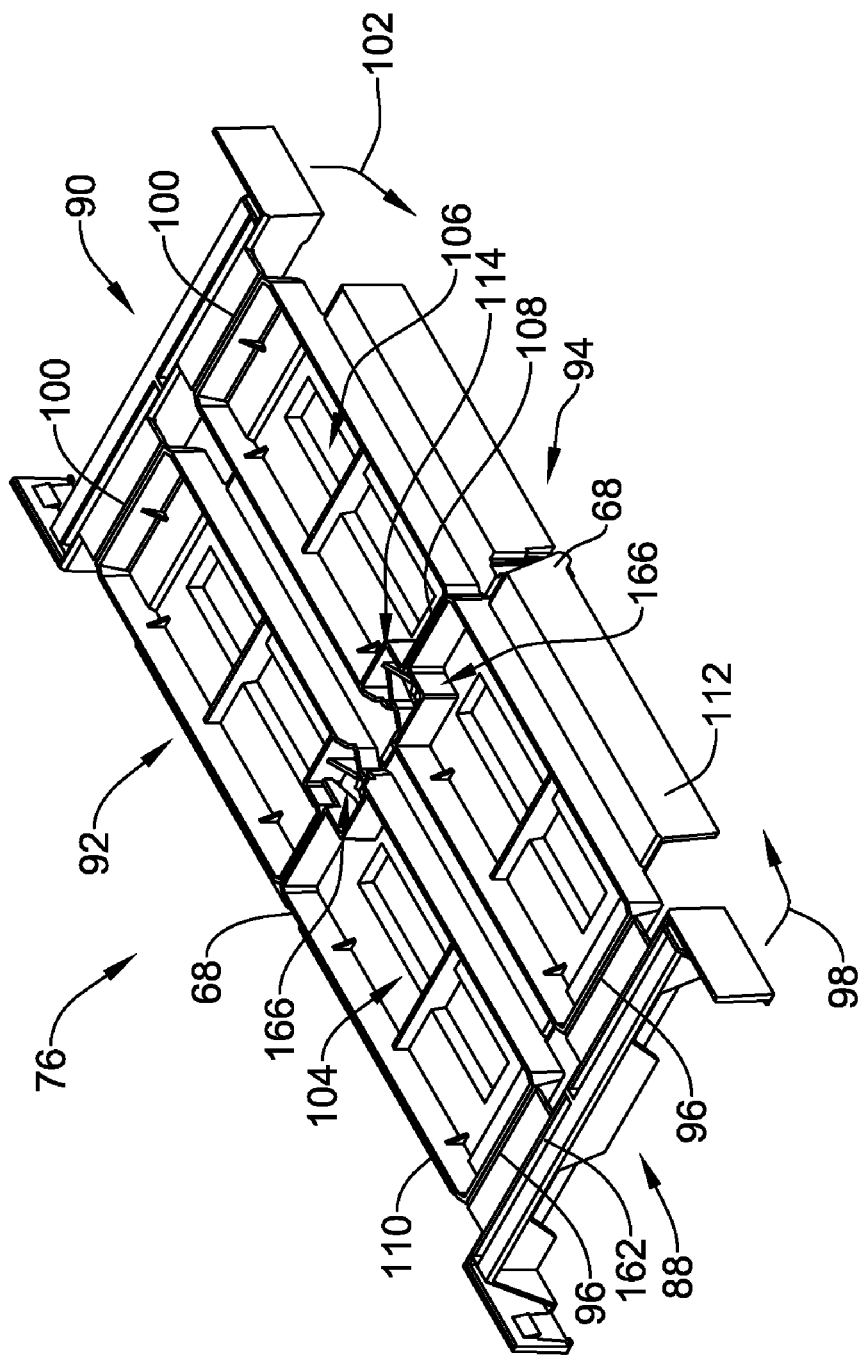
FIG. 5 is a perspective view showing an illustrative embodiment of one of the side frame members in FIG. 3.

Referring now to FIG. 5, an illustrative embodiment of one of the side frame members 76 in FIG. 3 will now be described in greater detail. As shown in FIG. 5, each side frame member 76 can include a first end section 88, a second end section 90, a first side section 92, and a second side section 94. The first end section 88 can be configured to bend or fold about a hinge 96 in the direction indicated generally by arrow 98, allowing the first end section 88 to support a portion of the outer end panel 30 when attached to the filter element 12a. The second end section 90, in turn, can be configured to bend or fold about a second hinge 100 in the direction indicated generally by arrow 102, allowing the second end section 90 to support a portion of the inner end panel 34 when attached to the filter element 12a. Similar end sections on the other side frame members 78,80,82 can be configured to similarly bend or fold about the end panels 28,30,32,34, thus providing similar support. When folded and attached to the end panels 28,30,32,34, the end sections 88,90 provide additional structural support to the filter member 12.

The first and second side sections 92,94 of each side frame member 76,78,80,82 can be configured to form a flange for retaining the filter member 12 within the filter frame 14. In the illustrative embodiment depicted in FIG. 5, for example, the first and second side sections 92,94 may extend inwardly a distance, forming a number of flanges 110,112 which act to retain the sides 24,26 of the filter member 12 within the filter frame 14.

The side frame member 76 may be further defined by a first frame panel section 104 and a second frame panel section 106. The first and second frame panel sections 104,106 are pivotally connected relative to each other along a common line 108 extending substantially lengthwise between the side sections 92,94 of the frame member 76. As the filter assembly 10 is actuated between its collapsed and expanded positions, a closet-door mechanism 114 located between the first and second frame panel sections 104,106 can be configured to maintain the pivotal alignment between the two sections 104, 106.

The side frame members 76,78,80,82 can be formed from a variety of materials, including, but not limited to, metal, extruded plastic, injection molded plastic, vacuum formed plastic, beverage board, cardboard, and/or chipboard. In some embodiments, for example, the side frame member 76 can be fabricated from a polymeric material by molding, extrusion, or other suitable manufacturing process. In some techniques, for example, the side frame member 76 can be fabricated by injection molding the first and second frame panel sections 104,106 as separate elements, and then attaching the two sections 104,106 together using attachment pins, adhesive tape, or other suitable attachment means. Alternatively, and in other embodiments, the side frame member 76 can be fabricated from a single member adapted to pivot or bend at one or more locations using a living hinge or other suitable mechanism.

Molding of the side frame members 76,78,80,82 may permit several of the features described herein to be incorporated into the part as well as to provide a convenient means of integrating features that facilitate attachment of the side frame members 76,78,80,82. While polymeric materials can be used to form the various frame panel sections 104,106, it should be understood that other non-polymeric materials can be used in addition to or in lieu of polymeric materials to fabricate the various components of the filter frame 14.

Figure 6:
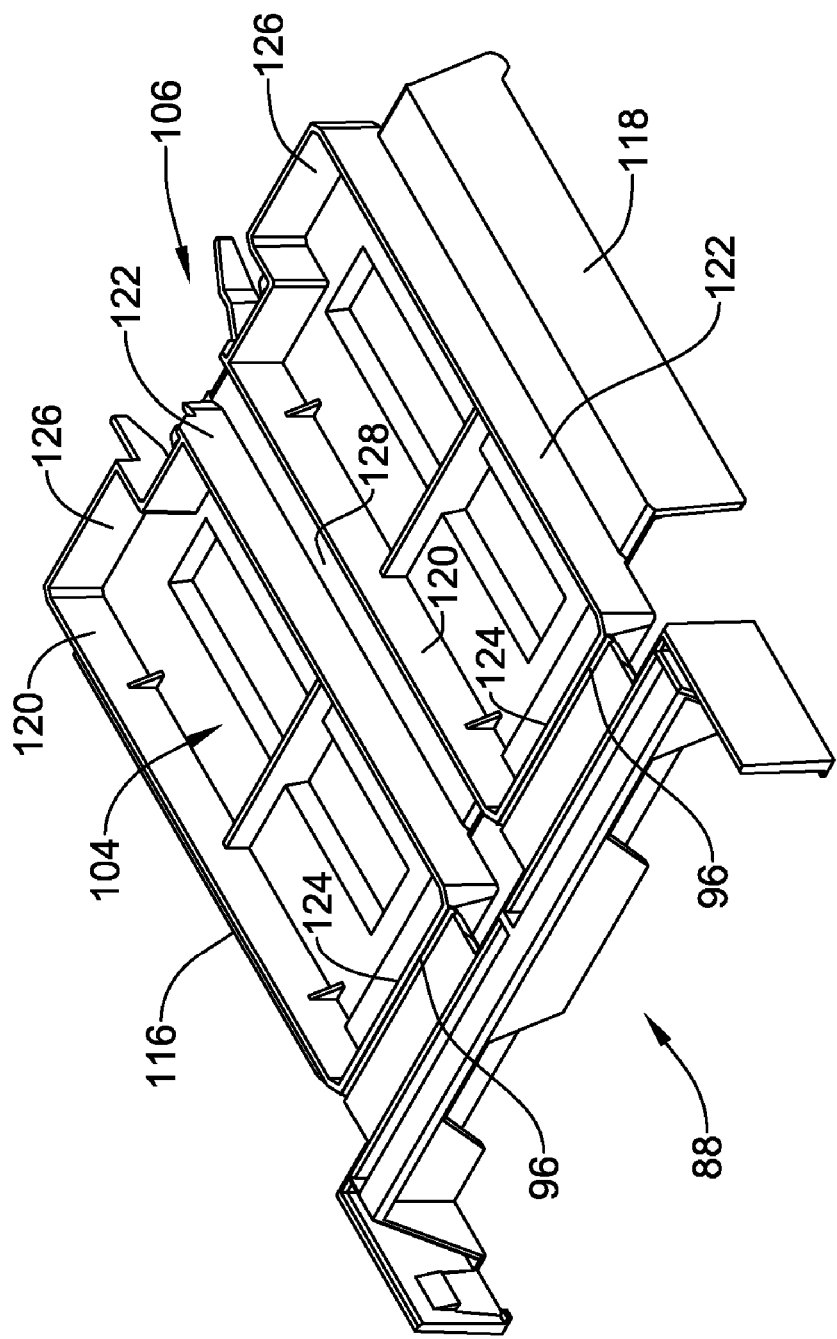
FIG. 6 is a perspective view showing one of the frame panel sections of FIG. 5.

FIG. 6 is a perspective view showing the first frame panel section 104 of FIG. 5 in greater detail. As can be seen in FIG. 6, the first frame panel section 104 can include a first side flange 116 and a second side flange 118, which are configured to overhang a portion of the sides 24,26 of the filter member 12. A number of raised walls 120,122,124,126 extending upwardly from the frame panel section 104 form a guide channel 128 that can be used to facilitate attachment of the filter assembly 10 to the filter box during the installation process.

Figure 7:
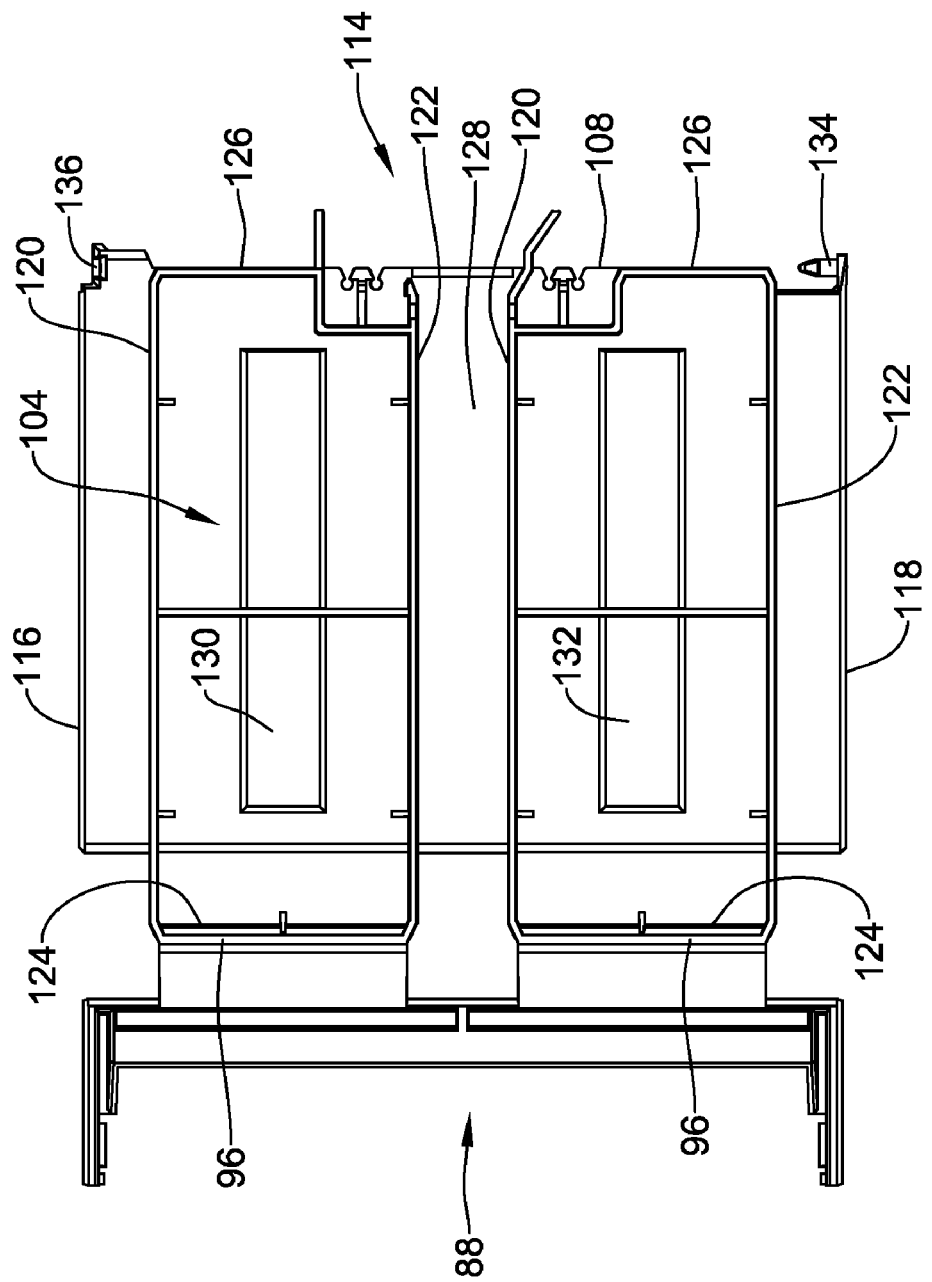
FIG. 7 is a top view of the frame panel section of FIG. 6.
Figure 8:
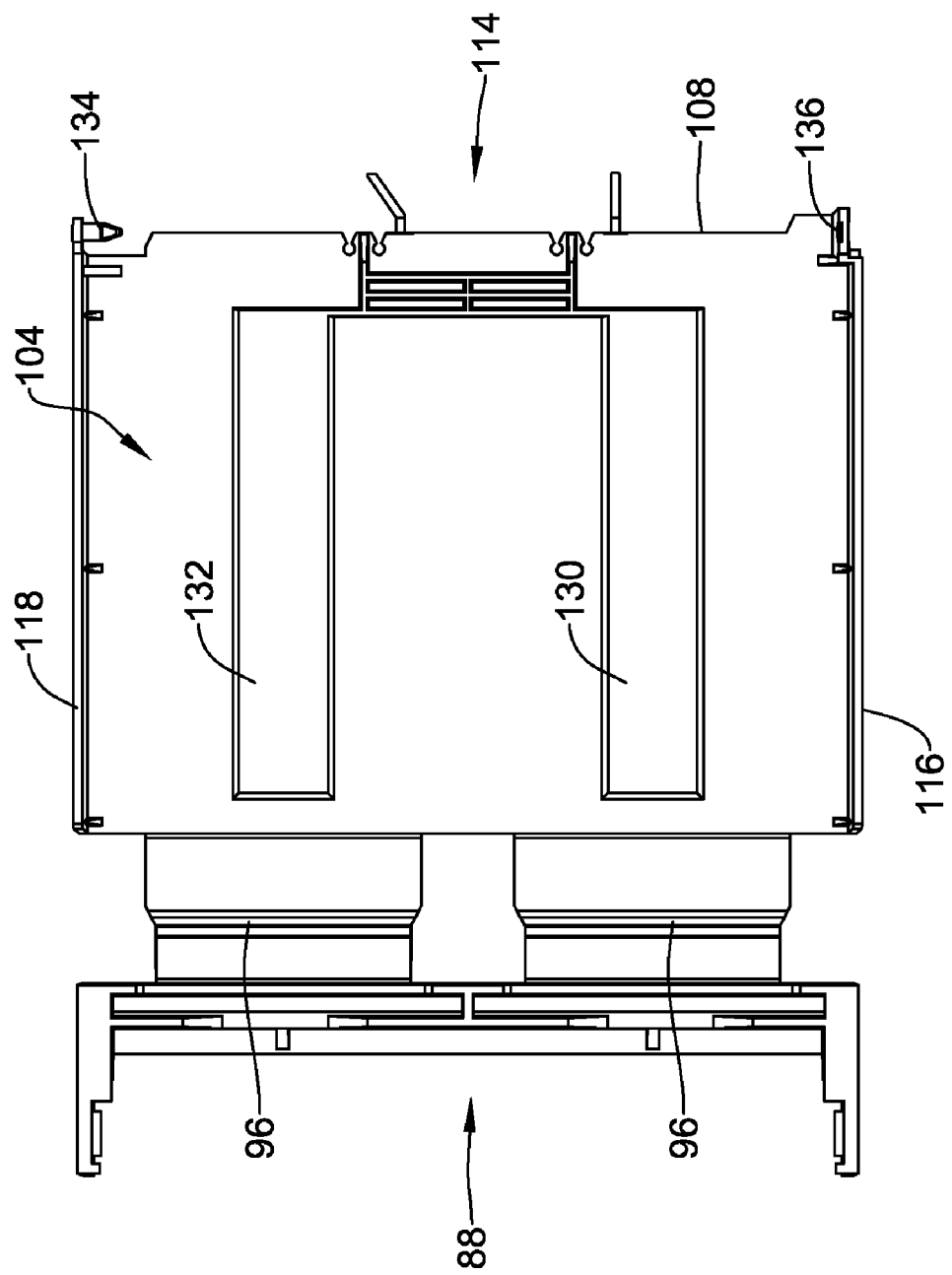
FIG. 8 is a bottom view of the frame panel section of FIG. 6.

FIGS. 7-8 are top and bottom views, respectively, showing the illustrative first frame panel section 104 of FIG. 6 in greater detail. As can be further seen in these views, the guide channel 128 formed by the raised walls 120,122,124,126 may extend along substantially the entire length of the frame panel section 104, forming a guide track that permits the filter assembly 10 to be inserted into a corresponding track formed within the interior of the filter box. The first frame panel section 104 may further include a number of recessed sections 130,132, which can be similarly provided to facilitate attachment of the filter frame 14 to the sides 24,26 of the filter member 12. A similar configuration can be provided for the second frame panel section 106, if desired.

Attachment of the first frame panel section 104 to the second frame panel section 106 can be accomplished using an attachment pin 134 extending inwardly from the second side flange 118, which can be configured to pivotally fit within a corresponding opening 136 formed on the second frame panel section 106. Likewise, an opening 136 formed on the first side flange 116 can be configured to receive a corresponding attachment pin 134 formed on the second frame panel section 106, providing a second attachment joint between the first and second frame panel sections 104,106.

Figure 9:
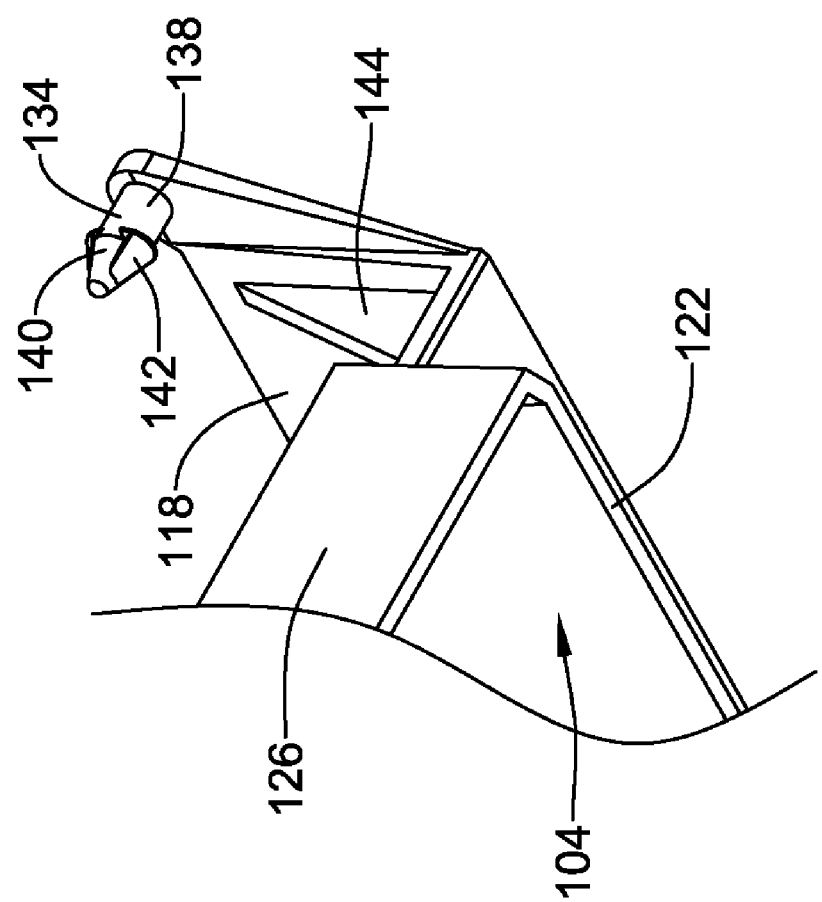
FIG. 9 is an exploded view showing the configuration of the attachment pin for the first frame panel section of FIG. 5.
Figure 10:
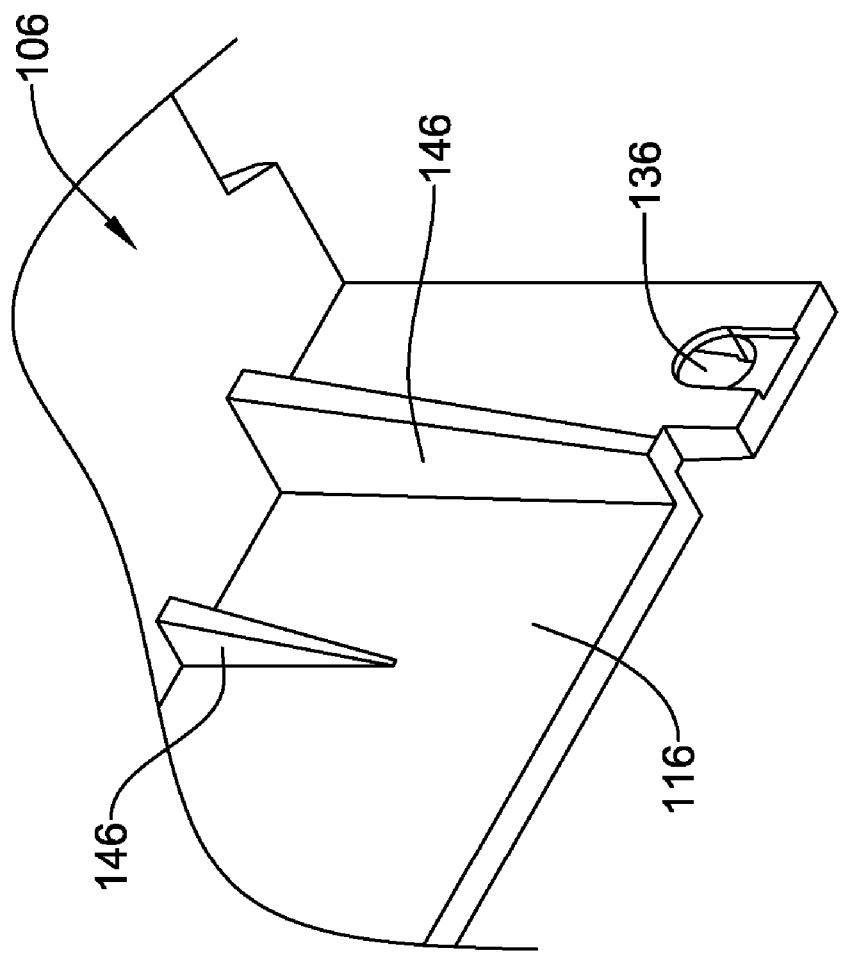
FIG. 10 is an exploded view showing the configuration of the attachment pin opening for the second frame panel section of FIG. 5.

An illustrative configuration of the attachment pin 134 and opening 136 can be further seen with respect to FIGS. 9 and 10, respectively. As shown therein, the attachment pin 134 can have a base section 138 and a head section 140, which can be configured to fit within the opening 136 while also permitting rotation of the pin 134 therein. In some embodiments, a protuberance 142 provided on the head section 140 of the attachment pin 134 can be used to permit the attachment pin 134 to be snap-fit within the opening 136. If desired, a number of reinforcement ribs 144,146 can be utilized to provide additional strength to the first and second frame panel sections 104,106.

Figure 11:
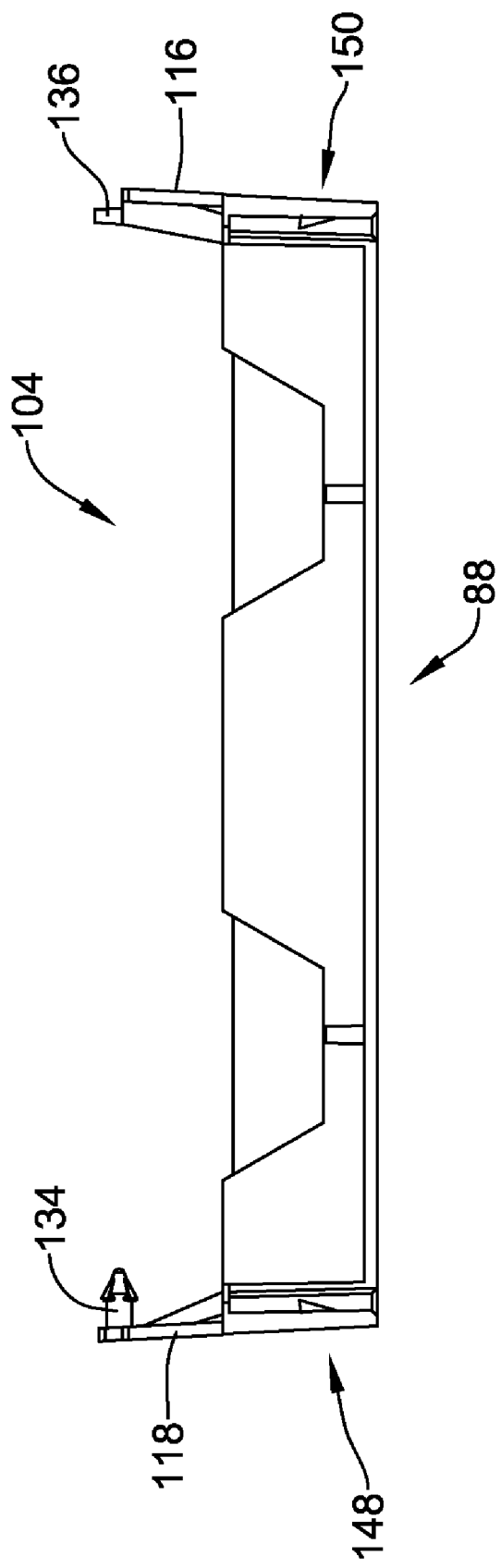
FIG. 11 is an end view of the first end section of FIG. 8.
Figure 12:
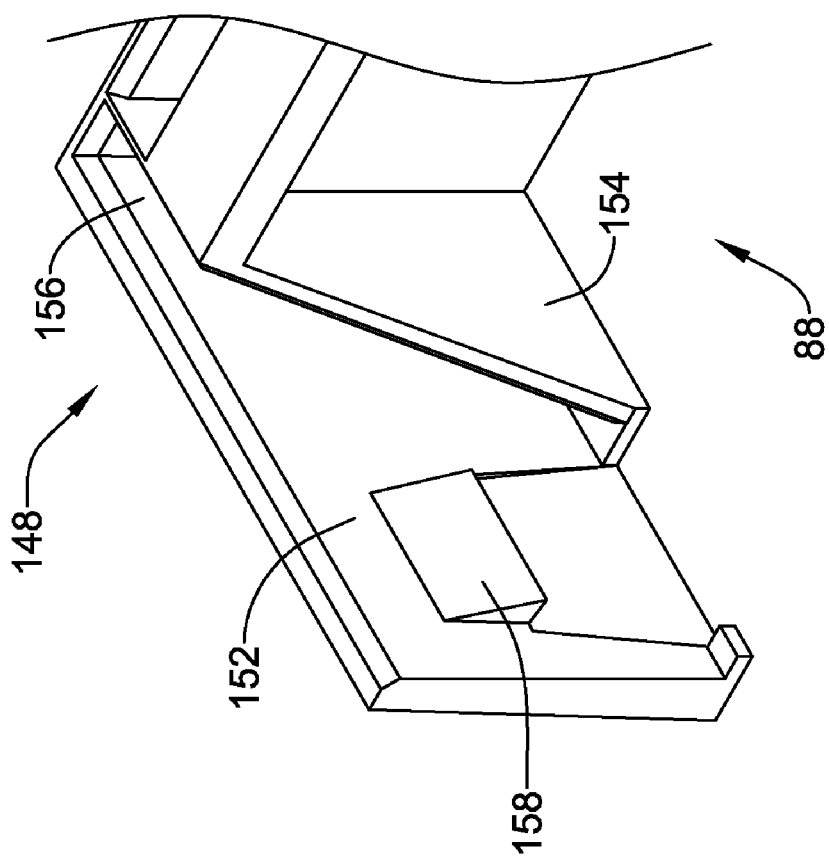
FIG. 12 is an exploded view showing one of the end panel locking mechanisms of FIG. 11.
Figure 13:
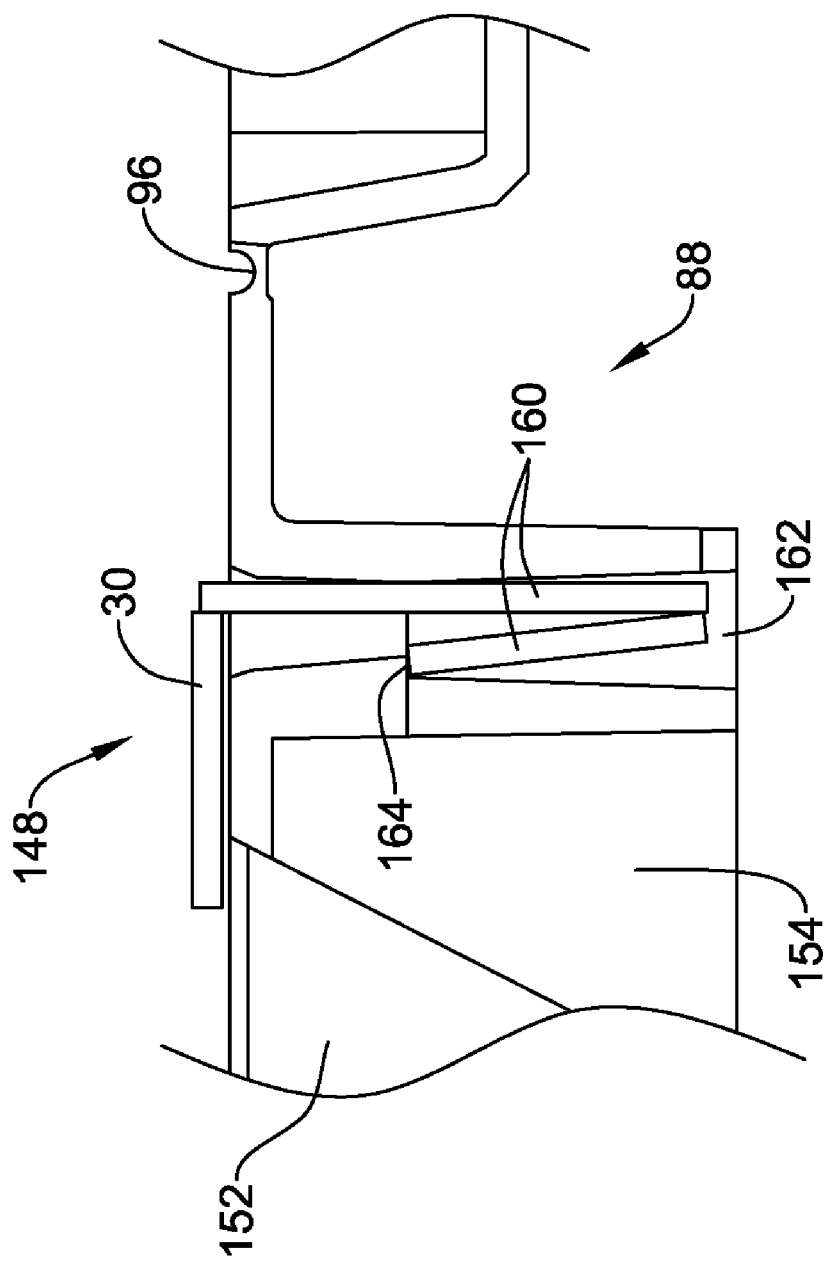
FIG. 13 is a section view along line 13-13 in FIG. 6 showing the attachment of an end panel to one of the end panel locking mechanisms of FIG. 11.

Referring now to FIGS. 11-13, the first end section 88 for the illustrative frame panel section 104 of FIG. 8 will now be described in greater detail. As shown in an end view in FIG. 11, the first end section 88 can include a number of end panel locking mechanisms 148,150 that can be used to facilitate attachment of the first end section 88 to the end panel 28 of the filter member 12. A first locking mechanism 148 on the first end section 88, for example, can be provided for attaching the first end section 88 to the portion of the end panel 28 located adjacent the first side 24 of the filter member 12. A second locking mechanism 150 on the first end section 88, in turn, can be provided for attaching the first end section 88 to a second portion of the end panel 28 located adjacent to the second side 26 of the filter member 12. A similar set of locking mechanisms can be provided on the second end section 90 of the first frame panel section 104 and for the other end sections of the filter frame 14 (e.g. the second frame panel section 106) to further aid in attaching those sections to the end panels of the filter member 12, if desired.

FIG. 12 is an exploded view showing one of the end panel locking mechanisms 148 of FIG. 11 in greater detail. As shown in FIG. 12, the locking mechanism 148 can be defined by an outer wall section 152 and an inner wall section 154 of the first end section 88, which together form a slot 156 configured to receive a corner portion of the end panel 30. In those embodiments where the filter member 12 includes end panels 30 made from paper or cardboard, for example, the slot 156 can be configured to frictionally receive a corner portion of the material forming the end panel 30. An inwardly extending tab 158 located on the outer wall section 152 can be configured to mate with a corresponding slot or opening formed through the thickness of the end panel 30, thus locking the first end section 88 to the end panel 30.

FIG. 13 is a section view showing the attachment of end panel 30 to one of the end panel locking mechanisms 148 of FIG. 11. As shown in FIG. 13, a folded or bent-back portion 160 of the end panel 30 can be inserted into a corresponding slot 162 formed within the first end section 88, which, as can be further seen in FIG. 5, may extend lengthwise in a direction substantially parallel to the hinge 96. Once inserted therein, the end panel 30 is prevented from being withdrawn from the slot 162 via a ridge 164, which engages the folded or bent-back portion 160 of the end panel 30, thus securing the end panel 30 to the first end section 88. If desired, a similar slot configuration can be provided for the other end panel locking mechanism 150 to secure the other side of the end panel 30 to the first end section 88.

Referring back to FIG. 5, the connection of the elastic members 84 to the side frame member 76 can be accomplished with a number of tie-down sections 166 formed on each of the first and second frame panel sections 104,106. A tie-down section 166 on the first and/or second frame panel sections 104,106, for example, can be configured to receive a portion of the elastic member 84 for securing the elastic member 84 to the side frame member 76. A similar tie-down section 166 formed on the first and/or second frame panel sections for the opposite side frame member 80, in turn, can be configured to receive another portion of the elastic member 84 for securing the elastic member 84 to the opposite side frame member 80, thereby biasing each of the side frame members 78,80 inwardly into their expanded positions.

Figure 14:
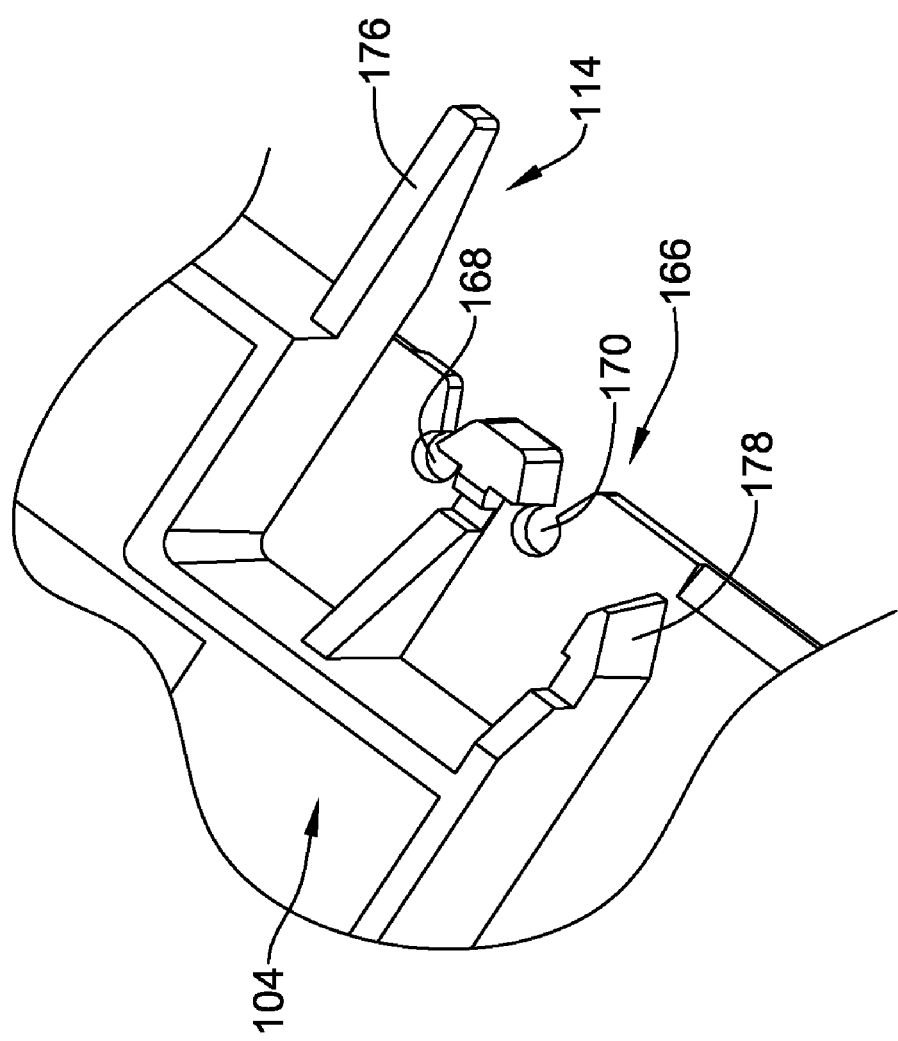
FIG. 14 is an exploded perspective view showing an illustrative embodiment of one of the tie-down sections of FIG. 5.

FIG. 14 is an exploded perspective view showing an illustrative embodiment of one of the tie-down sections 166 of FIG. 5. As shown with respect to the first frame panel section 104 in FIG. 14, the tie-down section 166 can include a number of slotted holes or openings 168,170, each of which can be configured to receive a portion of the elastic member 84 therethrough. The slotted holes or openings 168,170 can be made smaller than the diameter of the elastic member 84 so that, when assembled, a friction fit exists between the elastic member 84 and the holes or opening 168,170. If desired, a similar configuration can be provided for the other tie-down sections 166.

Figure 15:
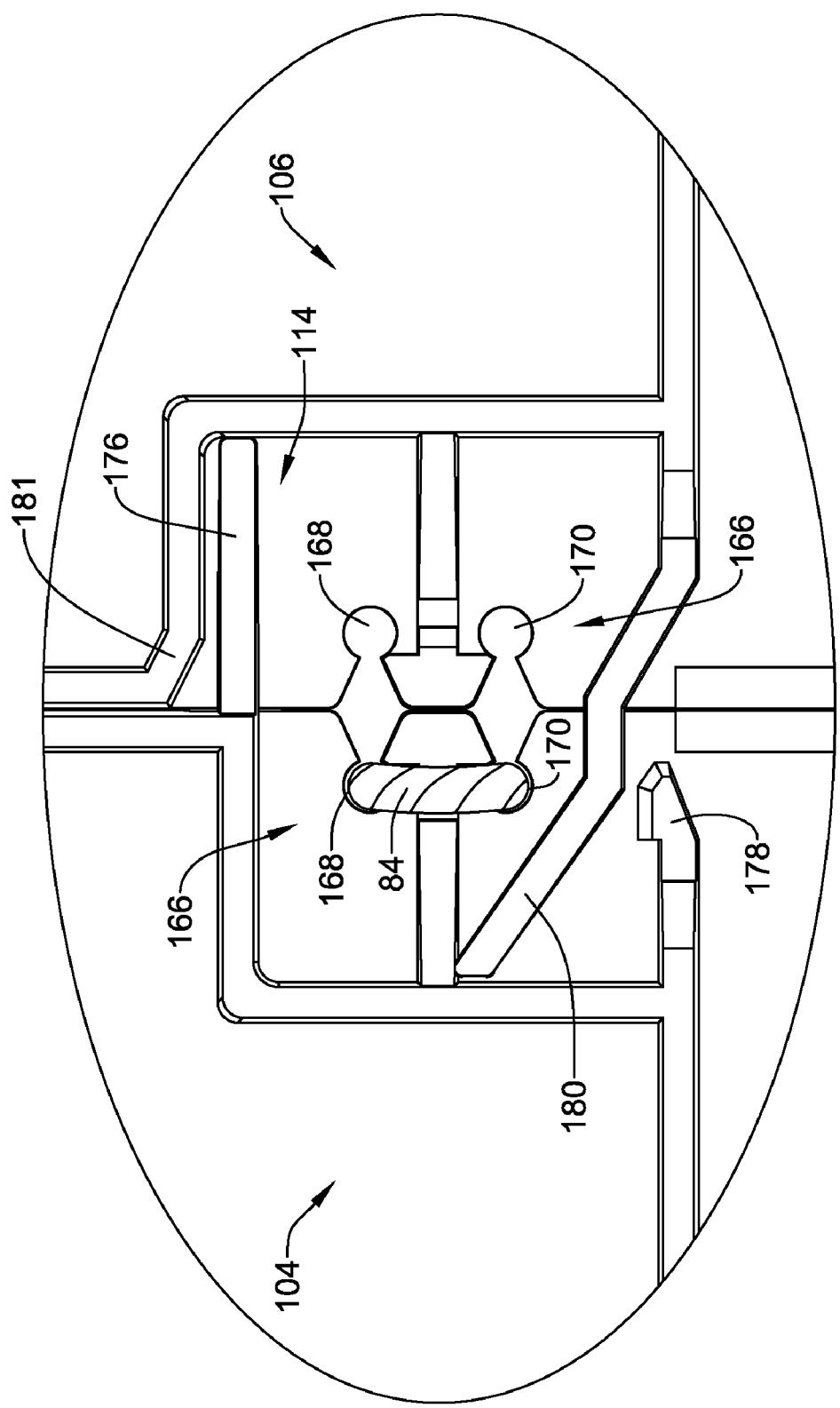
FIG. 15 is an exploded view showing the attachment of an elastic member to the tie-down section of FIG. 14.

FIG. 15 is an exploded view showing the attachment of an elastic member 84 to the tie-down section 166 of FIG. 14. As can be further seen in FIG. 15, the end of the elastic member 84 can be fed through each of the slotted holes or openings 168,170, which, based on their smaller size, function to frictionally engage and hold the elastic member 84 in place. A similar set of slotted holes or openings 168,170 can be provided on the second frame panel section 106 to permit the elastic member 84 to be connected to that panel section 106, or to permit another elastic member to be connected to each frame panel section 104,106.

As can be further seen with respect to FIGS. 14-15, a closet-door mechanism 114 can be provided at each tie-down section 166 to maintain the pivotal alignment between the two frame panel sections 104,106 when bent or folded relative to each other. The closet-door mechanism 114 can include a straight tab 176 and guide wall 178 extending outwardly from the first frame panel section 104, a bent tab 180 extending outwardly from the second frame panel section 106, and a side wall 181 located on the second frame panel section 106. A similar configuration can be provided at the other tie-down section 166 on the side frame member 76, providing a second pair of tabs and guide walls for aligning the first and second frame panel sections 104,106 together. In use, the tabs 176, 180 and guide walls 178,181 function to prevent the first and second frame panel sections 104,106 from becoming off-centered along line 108, thus ensuring that the two frame panel sections 104,106 are able to align with each other when the filter assembly 10 is expanded. If desired, a similar configuration can be provided for the other side frame members 78,80,82 to prevent similar misalignment from occurring at those locations.

Figure 16:
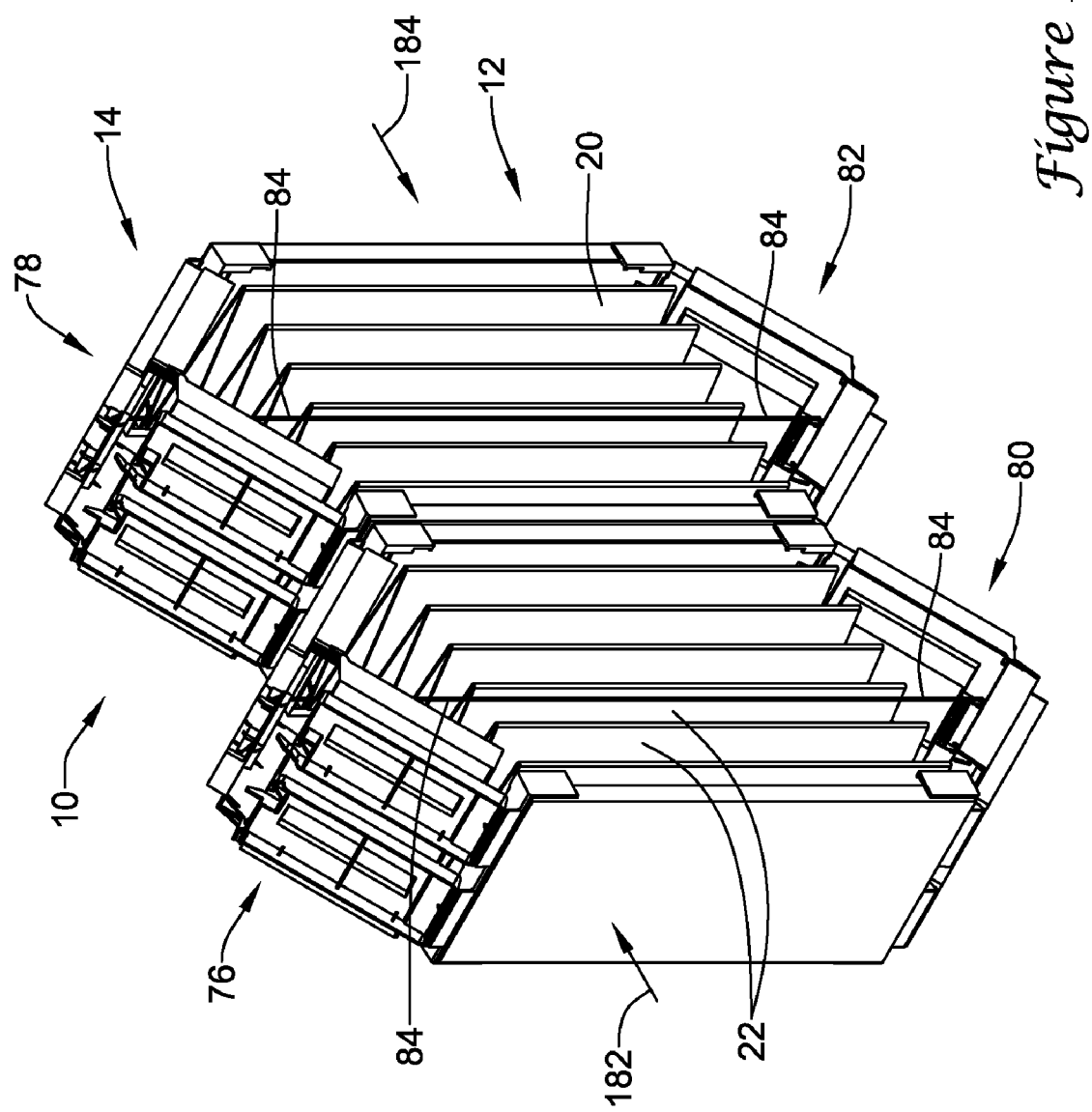
FIG. 16 is a perspective view of the filter assembly of FIG. 1 in a partially collapsed position.

The operation of the illustrative filter assembly 10 will now be described with respect to FIG. 16, which shows the filter assembly 10 of FIG. 1 in a partially collapsed position. As shown in FIG. 16, an inwardly directed force provided by the installer and indicated generally by arrows 182,184 can overcome the biasing force exerted of the side frame members 76,78,80,82 via the elastic members 84, causing the side frame members 76,78,80,82 to bend or fold outwardly, as shown. When this occurs, the filter elements 12a,12b forming the filter member 12 collapse, causing the pleats 22 to accordion inwardly and thus reduce the overall size of the filter assembly 10. Once at least partially collapsed in this manner, the filter assembly 10 can then be optionally packaged and/or stored for later use.

To subsequently expand the filter assembly 10 back into the position shown generally in FIG. 1, the filter assembly 10 can be subsequently removed from its packaging, causing the side frame members 76,78,80,82 to automatically pivot inwardly and expand the pleats 22 of the filter media 20. The inward biasing force exerted on the side frame members 76,78,80,82 from the elastic members 84 causes the filter frame 14 to expand and unfold, exerting an outwardly directed force on the filter media 20. When expanded in this manner, the filter assembly 10 can then be installed within the interior of the filter box and placed into service.

Although the illustrative side frame members 76,78,80,82 depicted in FIG. 16 are adapted to automatically unfold using a number of elastic members 84, it should be understood that the filter assembly 10 can be configured to operate without the use of such elastic members 84 in some embodiments. In such configuration, the side frame members 76,78,80,82 can be manually actuated into their expanded (i.e. unfolded) positions by applying an inwardly directed force to the members 76,78,80,82. In some cases, the act of inserting the filter assembly 10 into the filter box frame may also cause the side frame members 76,78,80,82 to unfold and assume their expanded configuration.

Figure 17:
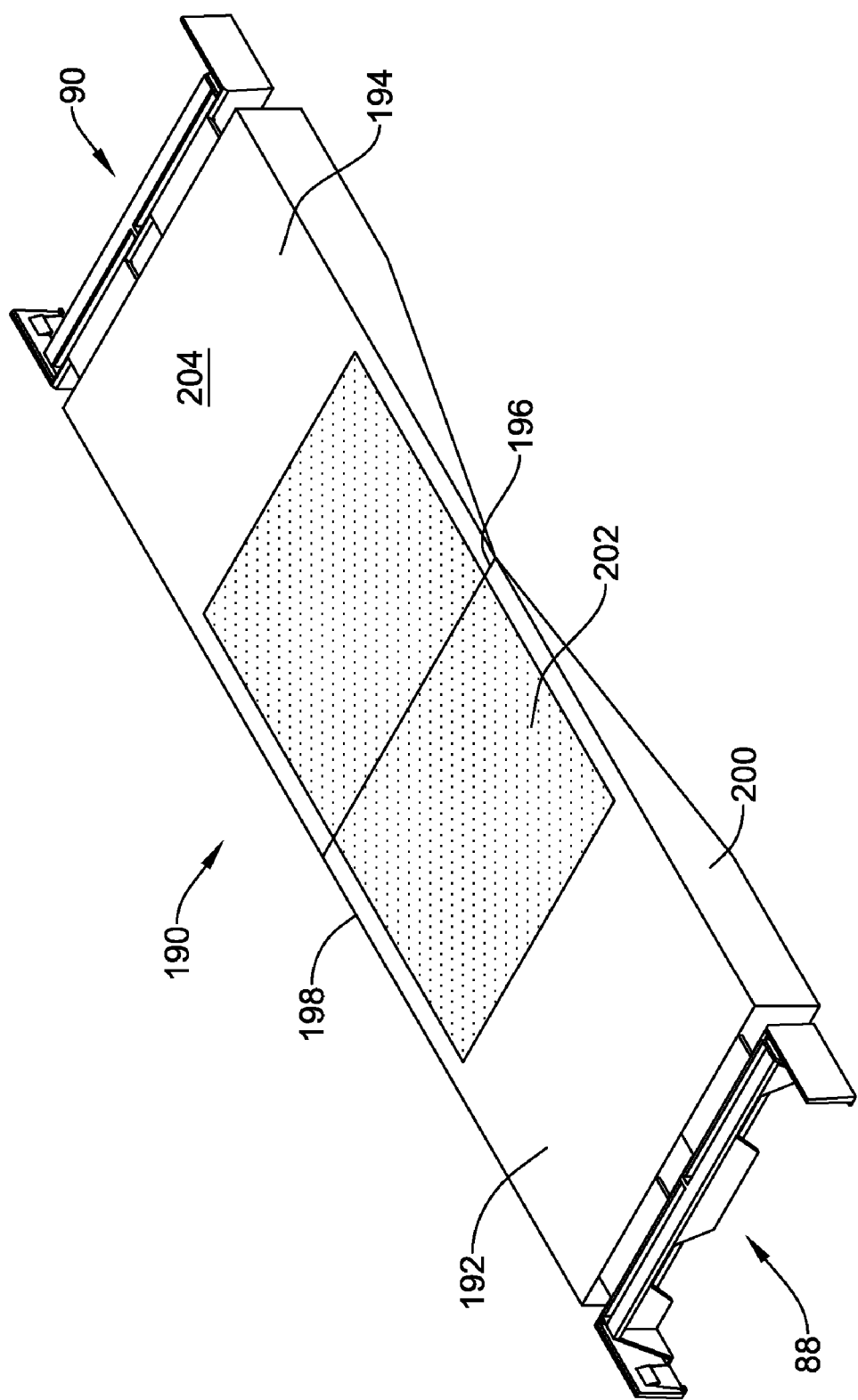
FIG. 17 is a perspective view showing another illustrative side frame member employing a tapered hinge.
Figure 18:
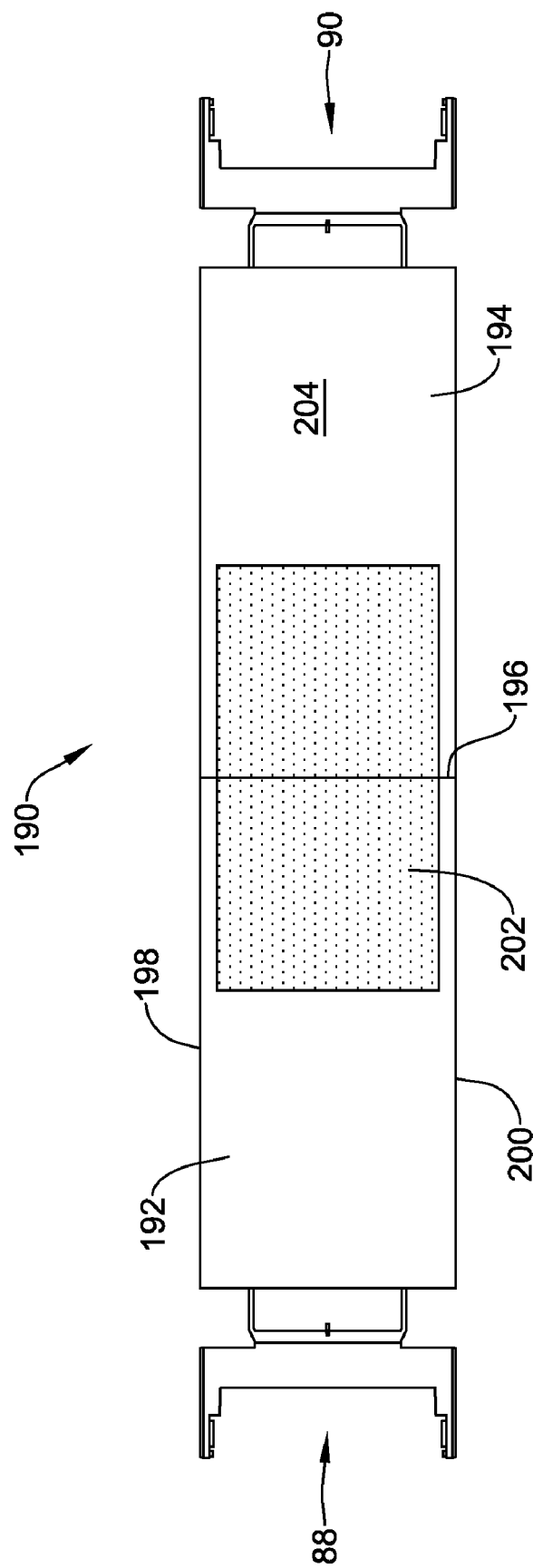
FIG. 18 is a top view of the side frame member of FIG. 17.

FIGS. 17-20 depict several views of a side frame member 190 in accordance with an alternative embodiment employing a tapered hinge. The illustrative side frame member 190 can be configured similar to the side frame members 76,78,80,82 described above, with like elements labeled in like fashion in the drawings. As shown in FIGS. 17-18, for example, the illustrative side frame member 190 can include first and second end sections 88,90 that can utilized to securely attach the side frame member 190 to the end panels 28,30,32,34 depicted in FIG. 1. Other features described herein may be further incorporated into the design of the side frame member 190, if desired.

The side frame member 190 can include a first frame panel section 192 and a second frame panel section 194, which together can be configured to support the sides of the filter member in a manner similar to other embodiments discussed herein. In the illustrative embodiment of FIGS. 17-20, the first frame panel section 192 is hingedly connected relative to the second frame panel section 194 along a common boundary 196 extending lengthwise between a first side section 198 and second side section 200 of the side frame member 190. A layer or strip of adhesive tape 202 or other suitable attachment means can be provided across the boundary 196 to secure the frame panel sections 192,194 together. In some embodiments, for example, the layer or strip of adhesive tape 202 can be applied to an upper surface 204 of the side frame member 190, although other attachment locations are possible. The adhesive tape 202 can include a plastic or paper type tape or other flexible material, and may attach to the frame panel sections 192,194 with a self-adhesive material or by means of a separately added adhesive. If desired, a separate mechanical hinge made from plastic or metal can be used to secure the frame panel sections 192,194 together using a suitable fastener such as rivets or screws. Alternatively, or in addition, attachment of the frame panel sections 192,194 can be accomplished by means of a snap-fit or interference fit between the sections 192,194.

Figure 19:
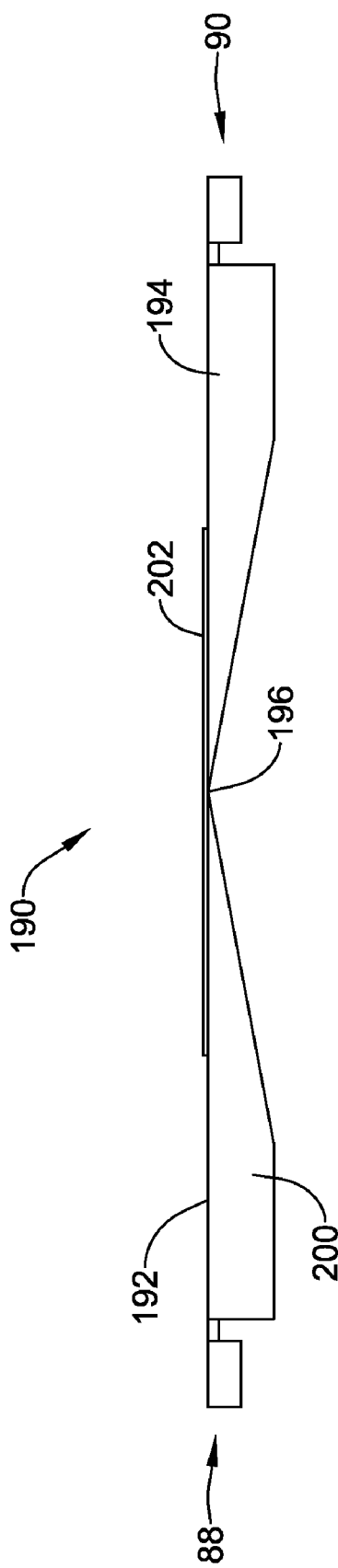
FIG. 19 is a side view of the side frame member of FIG. 17.

As can be further seen in FIG. 19, the first and second frame panel sections 192,194 can each have a tapered configuration to facilitate bending at boundary 196. The first frame panel section 192, for example, can be configured to taper from a relatively large thickness at or near the first end section 88 to a relatively small thickness at or near the boundary 196. In similar fashion, the second frame panel section 194 can be configured to taper from a relatively large thickness at or near the second end section 90 to a relatively small thickness at or near the boundary 196. In use, the tapered configuration of each frame panel section 192,194 permits the sections 192, 194 to pivot and fold relative to each other while also providing a flange for retaining the sides of the filter member within the filter frame.

Figure 20:
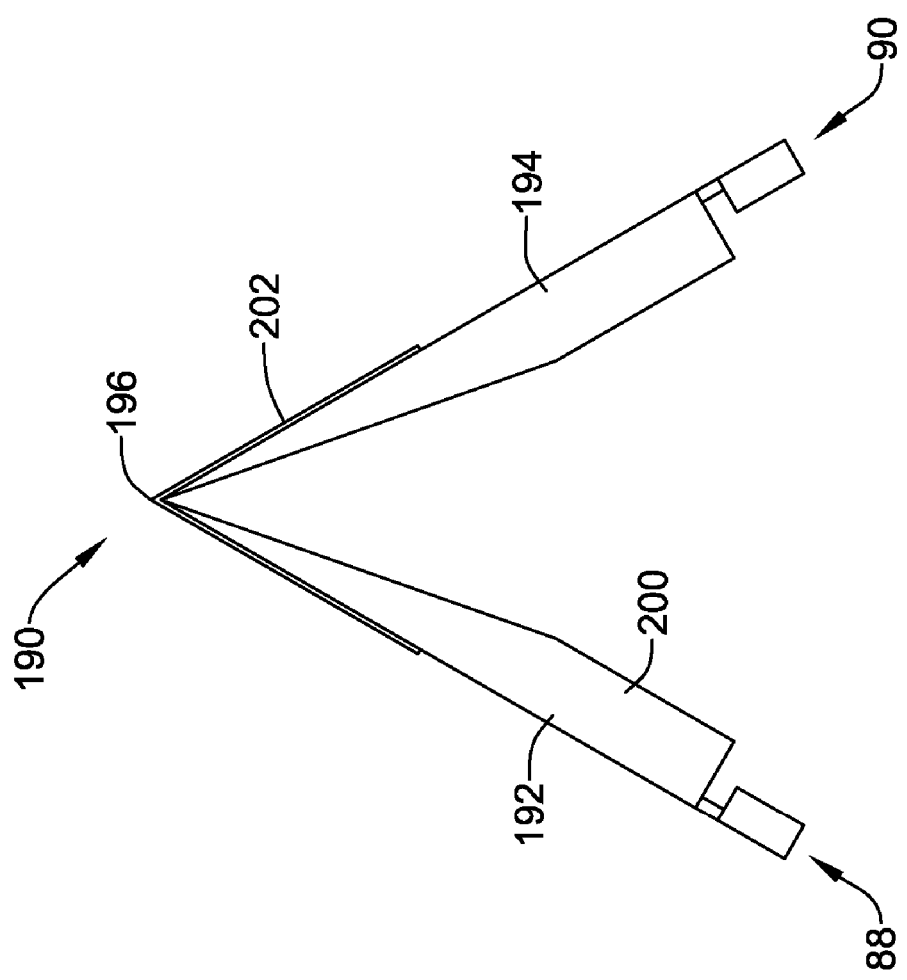
FIG. 20 is another side view showing the side frame member of FIG. 17 in a partially collapsed position.

FIG. 20 is a side view showing the illustrative side frame member 190 in a partially collapsed position. Collapsing of the side frame panel 190 can occur in a manner similar to that described above, by applying a longitudinal force to the filter member that causes the side frame member 190 to collapse and fold outwardly, as shown. When attached to the filter member, the bending of the side frame member 190 in this manner causes the pleats of the filter media to accordion inwardly, reducing the overall size of the filter assembly. In some embodiments, an optional elastic member (not shown) can be provided to automatically actuate the side frame member 190 back into its expanded position. The elastic member can be attached to the side frame member 190 using, for example, a hook or clasp formed on the side frame member 190, a slotted hole or opening through which the elastic member can be inserted or routed, or by some other suitable retention feature.

Figure 21:
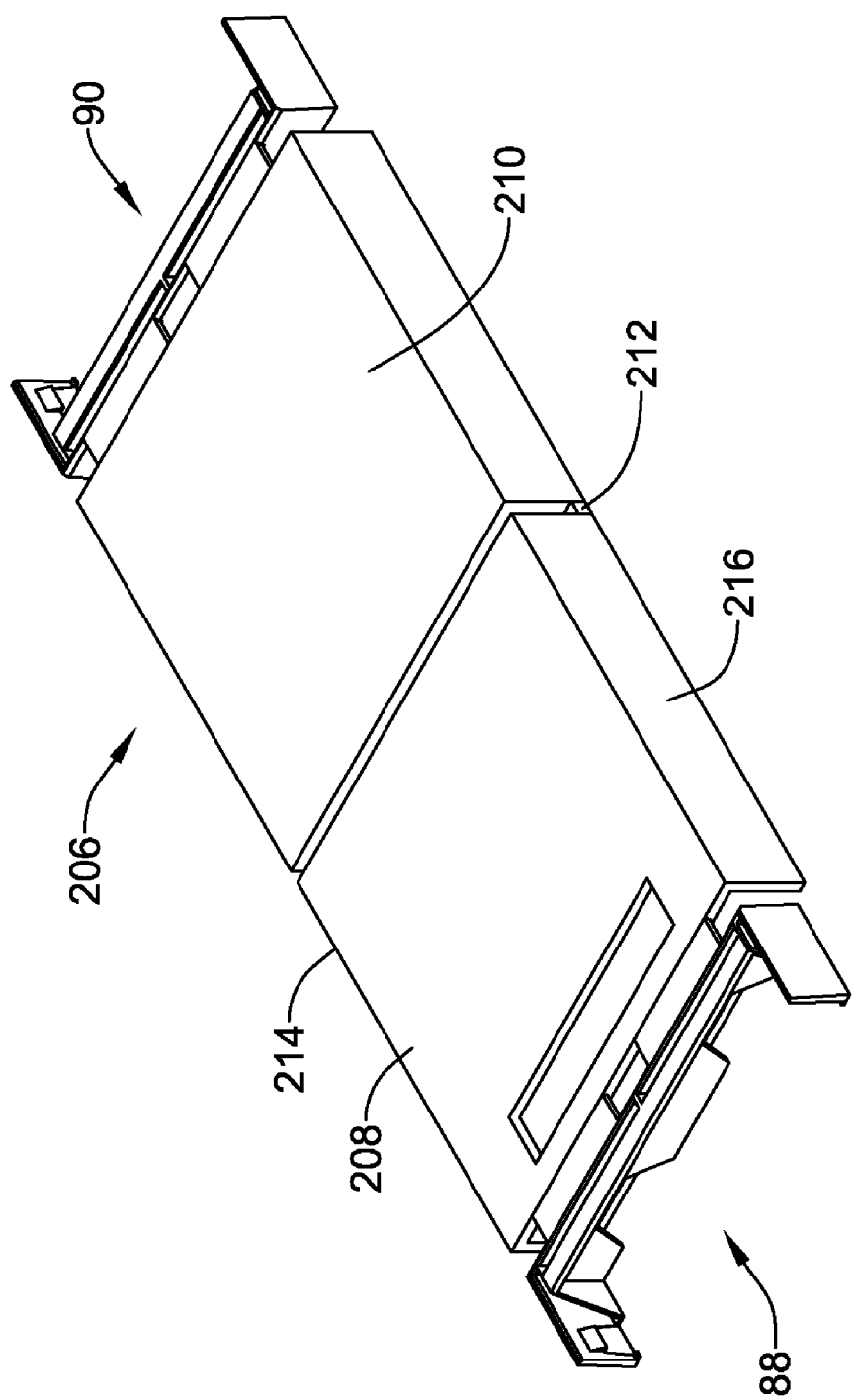
FIG. 21 is a perspective view showing another illustrative side frame member employing a living hinge.
Figure 22:
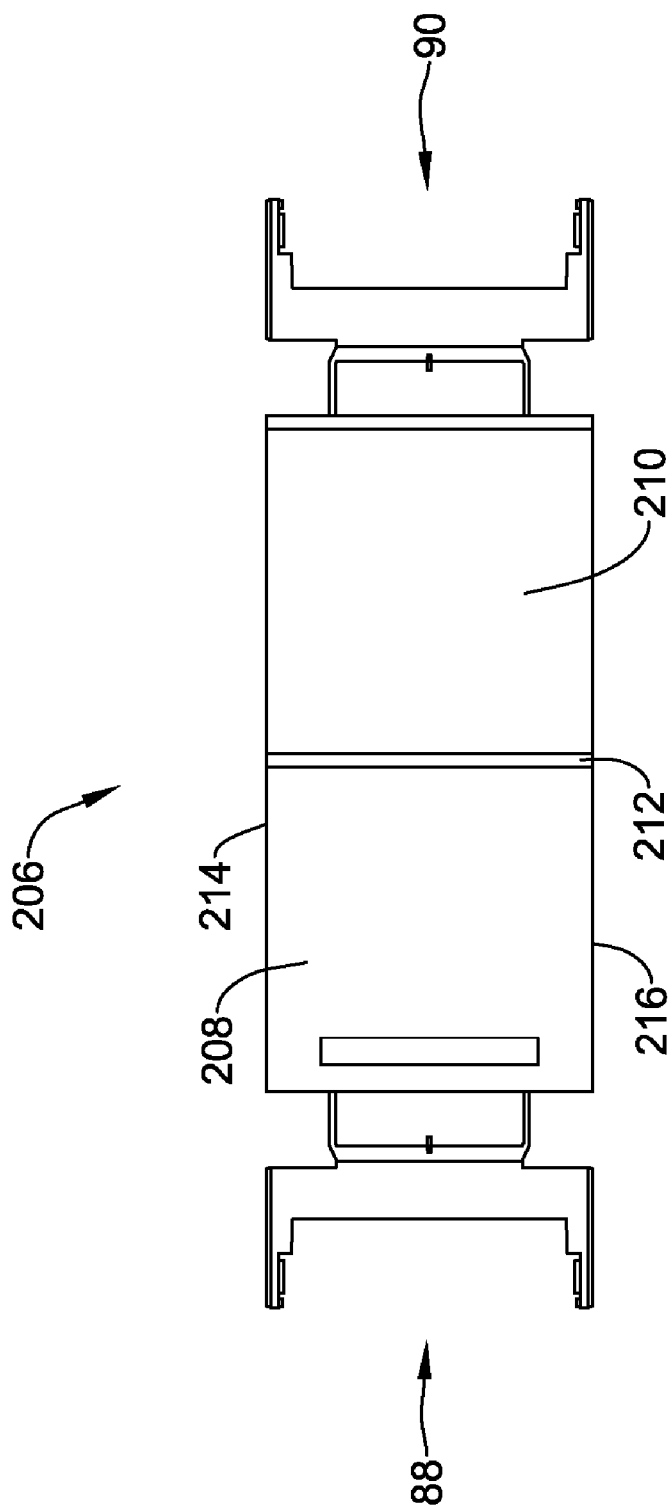
FIG. 22 is a top view of the side frame member of FIG. 21.
Figure 23:
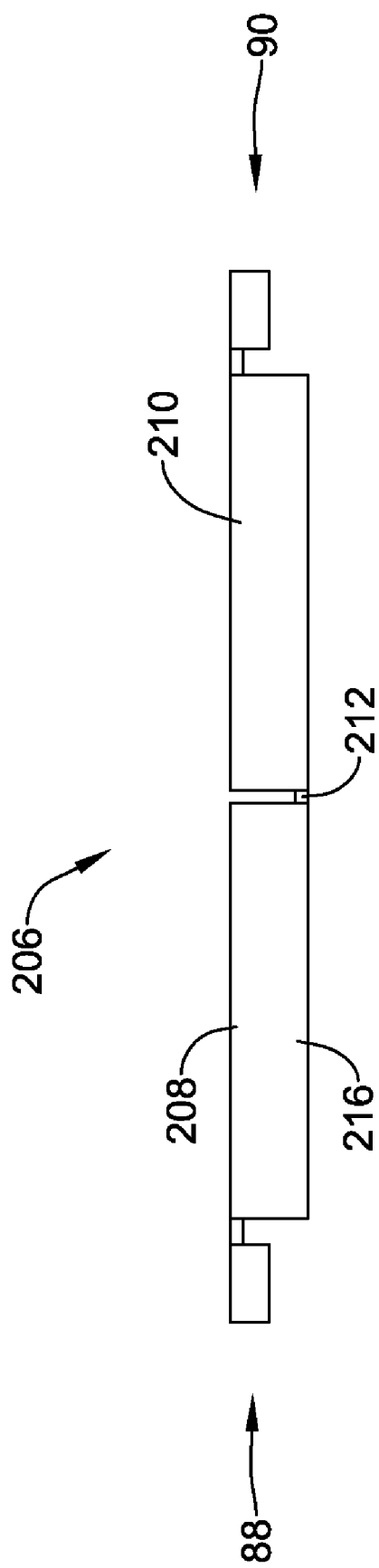
FIG. 23 is a side view of the side frame member of FIG. 21.

FIG. 21-24 depict several views of a side frame member 206 in accordance with an alternative embodiment employing a living hinge. The illustrative side frame member 206 can be configured similar to the side frame members 76,78,80,82 described above, with like elements labeled in like fashion in the drawings. As shown in FIGS. 21-22, for example, the illustrative side frame member 206 can include first and second end sections 88,90 that can be utilized to securely attach the side frame member 206 to the end panels 28,30,32,34 depicted in FIG. 1. Other features described herein may be further incorporated into the design of the side frame member 206, if desired.

The side frame member 206 can include a first frame panel section 208 and a section frame panel section 210, which together can be configured to support the sides of the filter member in a manner similar to other embodiments discussed herein. In the illustrative embodiment of FIGS. 21-24, the first frame panel section 208 is hingedly connected relative to the second frame panel section 210 via a living hinge 212 extending lengthwise between a first side section 214 and second side section 216 of the side frame member 206. In those embodiments where the side frame member 206 is molded from a single polymeric piece, for example, bending or folding of the side frame member 206 can be accomplished by incorporating the living hinge 212 into the molded part during the process of injection or extrusion molding. As shown further in FIG. 23, the living hinge 212 can comprise a thinned-down portion of the molded part used to fabricate the side frame member 206. It should be understood, however, that the living hinge 212 can be fabricated using other techniques depending on the materials and number of pieces used to fabricate the part, as well as other factors.

Figure 24:
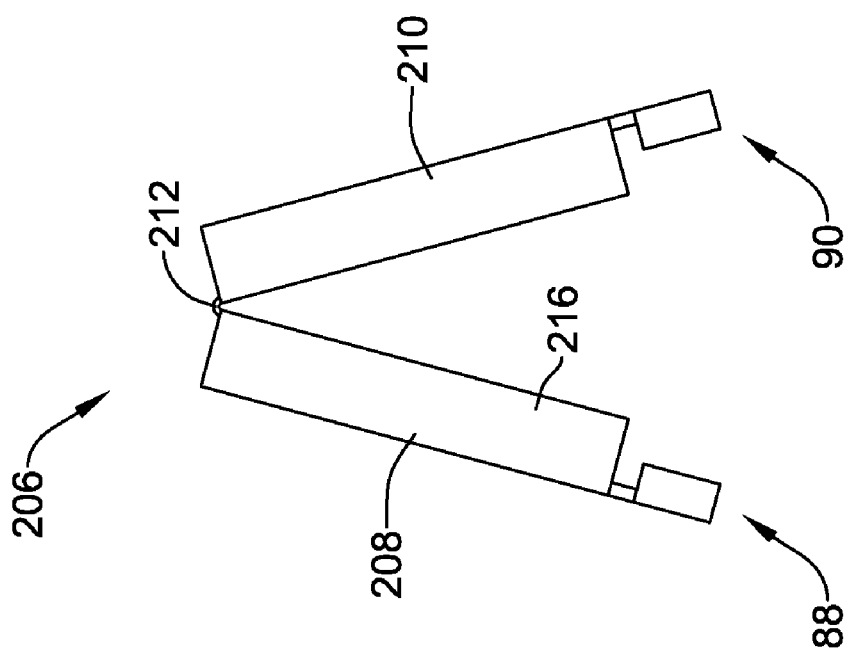
FIG. 24 is another side view showing the side frame member of FIG. 21 in a partially collapsed position.

FIG. 24 is a side view showing the illustrative side frame member 206 in a partially collapsed position. Collapsing of the side frame member 206 can occur in a manner similar to that described above, by applying a longitudinal force to the filter member that causes the side frame member 206 to collapse and fold outwardly, as shown. In some embodiments, an optional elastic member (not shown) can be provided to automatically actuate the side frame member 206 back into its expanded configuration. The elastic member can be attached to the side frame member 206 using, for example, a hook or clasp formed on the side frame member 206, a slotted hole or opening through which the elastic member can be inserted or routed, or by some other suitable retention feature.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A collapsible filter assembly, comprising:
   at least one filter element including a filter media having first and second sides and first and second end panels;
   a collapsible filter frame actuatable between a collapsed position and an expanded position, the collapsible filter frame including a first frame member configured to extend adjacent the first side of the filter media in the expanded position;
   wherein the first frame member is configured to bend or fold outwardly away from the first side of the filter media in said collapsed position; and
   an elastic member configured to bias the filter frame to the expanded position.

2. The collapsible filter assembly of claim 1, further comprising a second frame member configured to extend adjacent the second side of the filter media in the expanded position, wherein the second frame member is configured to bend or fold outwardly away from the second side of the filter media in said collapsed position.

3. The collapsible filter assembly of claim 1, wherein the elastic member is connected to at least the first frame member.

4. The collapsible filter assembly of claim 3, wherein the elastic member is connected to the second frame member.

5. The collapsible filter assembly of claim 3, wherein said first frame member includes a tie-down section configured to receive the elastic member.

6. The collapsible filter assembly of claim 5, wherein said second frame member includes a tie-down section configured to receive the elastic member.

7. The collapsible filter assembly of claim 1, wherein said filter media is a pleated filter media.

8. The collapsible filter assembly of claim 1, wherein the first frame member includes a flange for retaining at least part of the first side of the filter media within the filter frame when the filter frame is in the expanded position.

9. The collapsible filter assembly of claim 8, wherein the second frame member includes a flange for retaining at least part of the second side of the filter media within the filter frame when the filter frame is in the expanded position.

10. The collapsible filter assembly of claim 1, wherein the first frame member includes a first frame section hingedly connected to a second frame section.

11. The collapsible filter assembly of claim 10, wherein said first and second frame sections are hingedly connected using a number of attachment pins.

12. The collapsible filter assembly of claim 10, wherein said first and second frame sections each have a tapered configuration and are hingedly connected using an adhesive tape.

13. The collapsible filter assembly of claim 10, wherein said first and second frame sections are hingedly connected using a living hinge.

14. The collapsible filter assembly of claim 10, further comprising a closet-door mechanism for maintaining the pivotal alignment between the first and second frame sections.

15. The collapsible filter assembly of claim 1, wherein the first frame member further includes at least one foldable end section adapted to retain the first filter media end panel.

16. The collapsible filter assembly of claim 15, wherein the foldable end section includes a locking mechanism configured to frictionally receive a portion of the first filter media end panel.

17. A collapsible filter assembly, comprising:
at least one filter element including a pleated filter media having first and second sides and first and second end panels;
a collapsible filter frame actuatable between a collapsed position and an expanded position, the collapsible filter frame including a plurality of frame members each including a first frame section hingedly connected to a second frame section; and
an elastic member adapted to bias the filter frame in said expanded position, the elastic member being coupled to at least two opposing frame members;
wherein each frame member is adapted to bend or fold outwardly away from the sides of the filter media in said collapsed position.

18. The collapsible filter assembly of claim 17, wherein the elastic member is coupled to tie-down section of the frame member.

19. The collapsible filter assembly of claim 17, wherein each frame member includes a flange for retaining the sides of the filter media within the filter frame.

20. The collapsible filter assembly of claim 17, wherein said first and second frame sections are hingedly connected using a number of attachment pins.

21. The collapsible filter assembly of claim 17, wherein said first and second frame sections each have a tapered configuration and are hingedly connected using an adhesive tape.

22. The collapsible filter assembly of claim 17, wherein said first and second frame sections are hingedly connected using a living hinge.

23. The collapsible filter assembly of claim 17, further comprising a closet-door mechanism for maintaining the pivotal alignment between the first and second frame sections.

24. The collapsible filter assembly of claim 17, wherein each frame member further includes at least one foldable end section adapted to retain at least one of the first and second filter media end panels.

25. The collapsible filter assembly of claim 24, wherein each foldable end section includes a locking mechanism configured to frictionally receive a portion of the filter media end panel.

26. A collapsible filter assembly, comprising:
at least one filter element including a filter media having first and second sides and first and second end panels;
a collapsible filter frame actuatable between a collapsed position and an expanded position; and
wherein each frame member includes a flange for retaining the first and second sides of the filter media within the filter frame.

27. A collapsible filter assembly, comprising:
at least one filter element including a filter media having first and second sides and first and second end panels;
a collapsible filter frame actuatable between a collapsed position and an expanded position, the collapsible filter frame including a first frame member and a second frame member, wherein the first frame member extends between the first and second end panels in both the collapsed and expanded positions; and
wherein the first frame member is configured to bend or fold outwardly away from the first side of the filter media in the collapsed position.

28. The collapsible filter assembly of claim 27, wherein the second frame member extends between the first and second end panels in both the collapsed and expanded positions.

29. The collapsible filter assembly of claim 27, wherein the first frame member includes first and second sections, and a hinge between the first and second sections.

30. The collapsible filter assembly of claim 29, wherein the second frame member extends between the first and second end panels in both the collapsed and expanded positions, and wherein the second frame member includes first and second sections, and a hinge between the first and second sections.

31. The collapsible filter assembly of claim 30, wherein the hinge of the first frame member moves away from the first side of the filter when the filter frame moves to the collapsed position, and the hinge of the second frame member moves away from the second side of the filter when the filter frame moves to the collapsed position.

32. A collapsible filter assembly, comprising:
at least one filter element including a filter media having first and second sides and first and second end panels; and
a collapsible filter frame actuatable between a collapsed position and an expanded position, the collapsible filter frame including a first frame member configured to retain the first side of the filter media in the expanded position, and a second frame member configured to retain the first side of the filter media in the expanded position;
wherein each of the first and second frame members include at least one foldable end section including a locking mechanism configured to frictionally receive a portion of at least one of the filter media end panels, the foldable end section configured to retain at least one of the first and second filter media end panels.

* * * * *